(12) United States Patent
Wang et al.

(10) Patent No.: US 11,689,940 B2
(45) Date of Patent: Jun. 27, 2023

(54) MACHINE-LEARNING ARCHITECTURES FOR SIMULTANEOUS CONNECTION TO MULTIPLE CARRIERS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 518 days.

(21) Appl. No.: 16/714,341

(22) Filed: Dec. 13, 2019

(65) Prior Publication Data

US 2021/0182658 A1    Jun. 17, 2021

(51) Int. Cl.
| | |
|---|---|
| *H04W 24/02* | (2009.01) |
| *H04L 5/00* | (2006.01) |
| *G06N 3/02* | (2006.01) |
| *G06N 3/08* | (2006.01) |
| *H04W 16/14* | (2009.01) |
| *H04W 88/06* | (2009.01) |

(52) U.S. Cl.
CPC .............. *H04W 24/02* (2013.01); *G06N 3/02* (2013.01); *H04L 5/001* (2013.01); *G06N 3/08* (2013.01); *H04W 16/14* (2013.01); *H04W 88/06* (2013.01)

(58) Field of Classification Search
CPC ......... H04W 24/02; H04L 5/001; G06N 3/00; G06N 3/02
See application file for complete search history.

(56) References Cited

U.S. PATENT DOCUMENTS

| 6,347,091 B1 | 2/2002 | Wallentin et al. |
| 10,157,293 B2 | 12/2018 | Woss et al. |

(Continued)

FOREIGN PATENT DOCUMENTS

| CN | 107181600 | 9/2017 |
| EP | 3418948 | 12/2018 |

(Continued)

OTHER PUBLICATIONS

"International Search Report and Written Opinion", Application No. PCT/US2019/058328, dated Jul. 21, 2020, 12 pages.

(Continued)

*Primary Examiner* — Kevin C. Harper
(74) *Attorney, Agent, or Firm* — Womble Bond Dickinson (US) LLP

(57) ABSTRACT

Techniques and apparatuses are described for machine-learning architectures for simultaneous connection to multiple carriers. In implementations, a network entity determines at least one deep neural network (DNN) configuration for processing information exchanged with a user equipment (UE) over a wireless communication system using carrier aggregation that includes at least a first component carrier and a second component carrier. At times, the at least one DNN configuration includes a first portion for forming a first DNN at the network entity, and a second portion for forming a second DNN at the UE. The network entity forms the first DNN based on the first portion and communicates an indication of the second portion to the UE. The network entity directs the UE to form the second DNN based on the second portion, and uses the first DNN to exchange, over the wireless communication system, the information with the UE using the carrier aggregation.

21 Claims, 17 Drawing Sheets

(56) References Cited

U.S. PATENT DOCUMENTS

| | | | |
|---|---|---|---|
| 10,157,324 | B2 | 12/2018 | Aguera-Arcas |
| 10,375,585 | B2 | 8/2019 | Tan et al. |
| 10,461,421 | B1 | 10/2019 | Tran et al. |
| 2012/0054131 | A1 | 3/2012 | Williamson |
| 2015/0141027 | A1 | 5/2015 | Tsui et al. |
| 2016/0078339 | A1* | 3/2016 | Li .................... G06N 3/084 706/20 |
| 2016/0155050 | A1 | 6/2016 | Buibas et al. |
| 2016/0262167 | A1 | 9/2016 | Lan et al. |
| 2016/0328644 | A1 | 11/2016 | Lin et al. |
| 2017/0105210 | A1 | 4/2017 | Jeich et al. |
| 2017/0367036 | A1 | 12/2017 | Chen et al. |
| 2018/0034695 | A1 | 2/2018 | Balasubramanian et al. |
| 2018/0167778 | A1 | 6/2018 | Kodaypak |
| 2018/0324888 | A1 | 11/2018 | Shi et al. |
| 2018/0349508 | A1 | 12/2018 | Bequet et al. |
| 2018/0367985 | A1 | 12/2018 | Thomas |
| 2019/0014488 | A1 | 1/2019 | Tan et al. |
| 2019/0044535 | A1 | 2/2019 | Ahmad |
| 2019/0087689 | A1* | 3/2019 | Chen .................. G06K 9/6271 |
| 2019/0132708 | A1 | 5/2019 | Beighoul et al. |
| 2019/0138934 | A1 | 5/2019 | Prakash et al. |
| 2019/0171937 | A1 | 6/2019 | Lin et al. |
| 2019/0188285 | A1 | 6/2019 | Scheau et al. |
| 2019/0188553 | A1 | 6/2019 | Such et al. |
| 2019/0223073 | A1 | 7/2019 | Chen |
| 2019/0239238 | A1 | 8/2019 | Calabrese et al. |
| 2019/0268779 | A1 | 8/2019 | Peroulas et al. |
| 2019/0279082 | A1 | 9/2019 | Moloney et al. |
| 2019/0370636 | A1 | 12/2019 | Isopoussu |
| 2019/0372644 | A1 | 12/2019 | Chen et al. |
| 2019/0387372 | A1 | 12/2019 | Pedersen |
| 2019/0387448 | A1 | 12/2019 | Stauffer et al. |
| 2020/0053591 | A1 | 2/2020 | Prasad |
| 2020/0113017 | A1* | 4/2020 | Logothetis ............ H04W 88/14 |
| 2020/0229206 | A1 | 7/2020 | Badic et al. |
| 2020/0271743 | A1* | 8/2020 | Takeshima .......... G06N 3/0454 |
| 2020/0272899 | A1 | 8/2020 | Dunne et al. |
| 2020/0382929 | A1* | 12/2020 | Shi ........................ G06N 3/08 |
| 2021/0049451 | A1 | 2/2021 | Wang et al. |
| 2021/0064996 | A1 | 3/2021 | Wang et al. |
| 2021/0075691 | A1* | 3/2021 | Zeng ...................... G06N 3/04 |
| 2021/0158151 | A1 | 5/2021 | Wang et al. |
| 2021/0167875 | A1* | 6/2021 | Shen .................... H04W 16/28 |
| 2021/0342687 | A1 | 11/2021 | Wang et al. |
| 2021/0385682 | A1 | 12/2021 | Bedekar et al. |
| 2021/0406677 | A1 | 12/2021 | Wang |

FOREIGN PATENT DOCUMENTS

| | | |
|---|---|---|
| RU | 2010100877 | 7/2011 |
| WO | 2017091115 | 6/2017 |
| WO | 2018110985 | 6/2018 |
| WO | 2018149898 | 8/2018 |
| WO | 2018150083 | 8/2018 |
| WO | 20190116560 | 4/2019 |
| WO | 20190104280 | 5/2019 |
| WO | 2019116352 | 6/2019 |
| WO | 2019133049 | 7/2019 |
| WO | 2019137286 | 7/2019 |
| WO | 2019141902 | 7/2019 |
| WO | 2019211134 | 11/2019 |
| WO | 2020171803 | 8/2020 |
| WO | 2020229684 | 11/2020 |
| WO | 2021029889 | 2/2021 |
| WO | 2021029891 | 2/2021 |
| WO | 2021045748 | 3/2021 |
| WO | 20210863008 | 5/2021 |
| WO | 2021108082 | 6/2021 |
| WO | 2021118713 | 6/2021 |
| WO | 2021247254 | 12/2021 |
| WO | 2022005711 | 1/2022 |
| WO | 2022010685 | 1/2022 |

OTHER PUBLICATIONS

Dahlman, et al., "Carrier Aggregation", Retrieved at: https://www.sciencedirect.com/topics/engineering/carrier-aggregation—on Sep. 17, 2020, 2016, 14 pages.

Raghu, et al., "Deep Reinforcement Learning Based Power Control for Wireless Multicast Systems", Oct. 24, 2019, 9 pages.

Silver, "3 Ways Nokia Is Using Machine Learning in 5G Networks", Retrieved at: https://spectrum.ieee.org/tech-talk/telecom/wireless/3-ways-nokia-is-using-machine-learning-in-5g-networks, Jun. 25, 2018, 3 pages.

Sun, et al., "Application of Machine Learning in Wireless Networks: Key Techniques and Open Issues", Accessed online at: https://arxiv.org/pdf/1809.08707.pdf on Jul. 22, 2020, Mar. 1, 2019, 34 pages.

Tuban, et al., "Genetic Algorithm Approach for Dynamic Configuration of Multicast Broadcast Single Frequency Network Deployment in LTE", Nov. 2011, 5 pages.

Xu, et al., "Energy-Efficient Chance-Constrained Resource Allocation for Multicast Cognitive OFDM Network", May 2016, 8 pages.

"Architectural Framework for Machine Learning in Future Networks Including IMT-2020", Draft new Recommendation ITU-T Y.IMT2020-ML-Arch, Apr. 30, 2019, 28 pages.

"Discussion on AI/ML Model Transfer in 5GS", 3GGP SA WG1 #88, Nov. 2019, 13 pages.

"International Search Report and Written Opinion", Application No. PCT/US2020/058487, dated Mar. 9, 2021, 22 pages.

"International Search Report and Written Opinion", Application No. PCT/US2020/058557, dated Apr. 29, 2021, 13 pages.

"Invitation to Pay Additional Fees and Partial Search Report", Application No. PCT/US2020/058487, dated Jan. 29, 2021, 11 pages.

Chen, et al., "Deep Learning With Edge Computing: A Review", Aug. 2019, 21 pages.

Dorner, et al., "Deep Learning-Based Communication Over the Air", Jul. 11, 2017, 11 pages.

Ferrus, et al., "Applicability Domains of Machine Learning in Next Generation Radio Access Networks", Dec. 2019, 8 pages.

Mismar, et al., "Deep Learning in Downlink Coordinated Multi-point in New Radio Heterogeneous Networks", Mar. 14, 2019, 4 pages.

Samarakoon, "Federated Learning for Ultra-Reliable Low-Latency V2V Communications", Dec. 9, 2018, 7 pages.

Ye, et al., "Deep Learning Based end-to-end Wireless Communication Systems Without Pilots", Feb. 23, 2021, 13 pages.

"International Preliminary Report on Patentability", Application No. PCT/US2019/046535, dated Feb. 8, 2022, 10 pages.

"International Preliminary Report on Patentability", Application No. PCT/US2019/046546, dated Feb. 8, 2022, 8 pages.

"International Preliminary Report on Patentability", Application No. PCT/US2020/058487, dated Mar. 4, 2022, 16 pages.

"International Preliminary Report on Patentability", Application No. PCT/US2019/049566, dated Mar. 8, 2022, 8 pages.

"International Preliminary Report on Patentability", Application No. PCT/US2020/058557, dated Mar. 14, 2022, 8 pages.

"International Search Report and Written Opinion", Application No. PCT/US2021/036497, dated Feb. 7, 2022, 18 pages.

Liu, et al., "HierTrain: Fast Hierarchical Edge AI Learning with Hybrid Parallelism in Mobile-Edge-Cloud Computing", Mar. 22, 2020, 11 pages.

"3rd Generation Partnership Project; Technical Specification Group Services and System Aspects; Study on application architecture for enabling Edge Applications; (Release 17)", 3GPP TR 23.758 V17.0.0 (Dec. 2019), Dec. 2019, 113 pages.

"Foreign Office Action", European Application No. 19805861.2, dated Jul. 9, 2020, 7 pages.

"International Search Report and Written Opinion", PCT Application No. PCT/US2019/059094, dated Feb. 17, 2020, 16 pages.

"International Search Report and Written Opinion", PCT Application No. PCT/US2019/046546, dated Apr. 9, 2020, 13 pages.

"International Search Report and Written Opinion", PCT Application No. PCT/US2019/046535, dated May 20, 2020, 17 pages.

(56) References Cited

OTHER PUBLICATIONS

"International Search Report and Written Opinion", PCT Application No. PCT/US2019/049566, dated May 26, 2020, 13 pages.

Bonawitz, et al., "Towards Federated Learning at Scale: System Design", Proceedings of the 2 nd SysML Conference, Palo Alto, CA, USA, 2019, 15 pages.

Huang, et al., "Deep Learning for Physical-Layer 5G Wireless Techniques: Opportunities, Challenges and Solutions", Apr. 23, 2019, 18 pages.

Jiang, et al., "Machine Learning Paradigms for Next-Generation Wireless Networks", Technical Report of Wireless Networking Group, Coordinated Science Laboratory, Dept. Electrical and Computer Engineering, University of Illinois, vol. 24, No. 2, Apr. 1, 2017, Apr. 1, 2017, 8 pages.

Klautau, et al., "5G MIMO Data for Machine Learning: Application to Beam-Selection Using Deep Learning", 2018 Information Theory and Applications Workshop (ITA), Feb. 1, 2018, Feb. 1, 2018, 9 pages.

Yao, et al., "Arlificial Intelligence-Defined 5G Radio Access Networks", IEEE Communications Magazine, Mar. 2019, Mar. 2019, 7 pages.

"International Search Report and Written Opinion", Application No. PCT/US2021/033645, dated Sep. 16, 2021, 17 pages.

"International Search Report and Written Opinion", Application No. PCT/US2021/039408, dated Dec. 1, 2021, 11 pages.

"Invitation to Pay Additional Fees", Application No. PCT/US2020/058487, dated Sep. 23, 2021, 4 pages.

"Invitation to Pay Additional Fees", Application No. PCT/US2021/036497, dated Sep. 28, 2021, 11 pages.

"Written Opinion", Application No. PCT/US2020/058557, dated Oct. 20, 2021, 7 pages.

"Written Opinion", Application No. PCT/US2020/058487, dated Oct. 25, 2021, 14 pages.

Chen, et al., "A Joint Learning and Communications Framework for Federated Learning Over Wireless Networks", IEEE Transactions on Wireless Communications, Sep. 17, 2019, 30 pages.

Kang, et al., "Neurosurgeon: Collaborative Intelligence Between the Cloud and Mobile Edge", ACM SIGARCH Computer Architecture News, Apr. 2017, 11 pages.

Khan, et al., "Self Organizing Federated Learning Over Wireless Networks: A Socially Aware Clustering Approach", 2020 International Conference on Information Networking, Jan. 7, 2020, 6 pages.

Miyamoto, et al., "AI-Assisted Workflow Management Framework for Automated Closed-Loop Operation", IEEE/IFIP Network Operations and Management Symposium, Apr. 2018, 6 pages.

Nishio, et al., "Client Selection for Federated Learning with Heterogeneous Resources in Mobile Edge", IEEE International Conference on Communications, May 20, 2019, 11 pages.

Sun, et al., "Adaptive Federated Learning with Gradient Compression in Uplink NOMA", Cornell University Library, Mar. 3, 2020, 10 pages.

Wang, et al., "Convergence of Edge Computing and Deep Learning: A Comprehensive Survey", IEEE Communications Surveys & Tutorials PP(99):1-1, Jan. 2020, 36 pages.

\* cited by examiner

1700 ⬈

```
┌─────────────────────────────────────────────┐
│ Receive an indication of at least one DNN   │
│ configuration for processing information    │
│ exchanged over a wireless communication     │
│ system using a simultaneous connection      │
│ with multiple component carriers            │
│ 1705                                        │
└─────────────────────────────────────────────┘
                      │
                      ▼
┌─────────────────────────────────────────────┐
│ Form at least one DNN based on the indication│
│ 1710                                        │
└─────────────────────────────────────────────┘
                      │
                      ▼
┌─────────────────────────────────────────────┐
│ Use the at least one DNN to process the     │
│ information exchanged over the wireless     │
│ communication system using the simultaneous │
│ connection with the multiple component carriers│
│ 1715                                        │
└─────────────────────────────────────────────┘
```

Fig. 17

MACHINE-LEARNING ARCHITECTURES FOR SIMULTANEOUS CONNECTION TO MULTIPLE CARRIERS

BACKGROUND

The evolution of wireless communication systems oftentimes stems from a demand for data throughput. As one example, the demand for data increases as more and more devices gain access to wireless communication systems. Evolving devices also execute data-intensive applications that utilize more data than traditional applications, such as data-intensive streaming-video applications, data-intensive social media applications, data-intensive audio services, etc. Thus, to accommodate increased data usage, evolving wireless communication systems utilize increasingly complex architectures to provide more data throughput relative to legacy wireless communication systems.

As one example, fifth generation (5G) standards and technologies transmit data using higher frequency bands, such as the above-6 Gigahertz (GHz) band (e.g., 5G millimeter wave (mmW) technologies) to increase data capacity. However, transmitting and recovering information using these higher frequency ranges poses challenges. To illustrate, higher frequency signals are more susceptible to multipath fading, scattering, atmospheric absorption, diffraction, interference, and so forth, relative to lower-frequency signals. These signal distortions oftentimes lead to errors when recovering the information at a receiver. As another example, hardware capable of transmitting, receiving, routing, and/or otherwise using these higher frequencies can be complex and expensive, which increases the processing costs in a wirelessly-networked device.

SUMMARY

This document describes techniques and apparatuses for machine-learning architectures for simultaneous connection to multiple carriers. In implementations, a network entity determines at least one deep neural network (DNN) configuration for processing information exchanged with a user equipment (UE) over a wireless communication system using carrier aggregation that includes at least a first component carrier and a second component carrier. At times, the at least one DNN configuration includes a first portion for forming a first DNN at the network entity, and a second portion for forming a second DNN at the UE. The network entity forms the first DNN based on the first portion and communicates an indication of the second portion to the UE. The network entity directs the UE to form the second DNN based on the second portion, and uses the first DNN to exchange, over the wireless communication system, the information with the UE using the carrier aggregation.

Aspects of machine-learning architectures for simultaneous connection to multiple carriers include a user equipment (UE) associated with a wireless communication system. In implementations, the UE receives an indication of at least one deep neural network (DNN) configuration for processing information exchanged over the wireless communication system using carrier aggregation that includes at least a first component carrier and a second component carrier. The UE forms, based on the indication, at least one DNN. The UE then uses the at least one DNN to process the information exchanged over the wireless communication system using the carrier aggregation.

The details of one or more implementations of machine-learning architectures for simultaneous connection to multiple carriers are set forth in the accompanying drawings and the following description. Other features and advantages will be apparent from the description and drawings, and from the claims. This summary introduces subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of machine-learning architectures for simultaneous connection to multiple carriers for wireless networks are described below. The use of the same reference numbers in different instances in the description and the figures indicate similar elements:

FIG. 17 illustrates an example method for using machine-learning architectures for simultaneous connection to multiple carriers.

DETAILED DESCRIPTION

Figure 1:
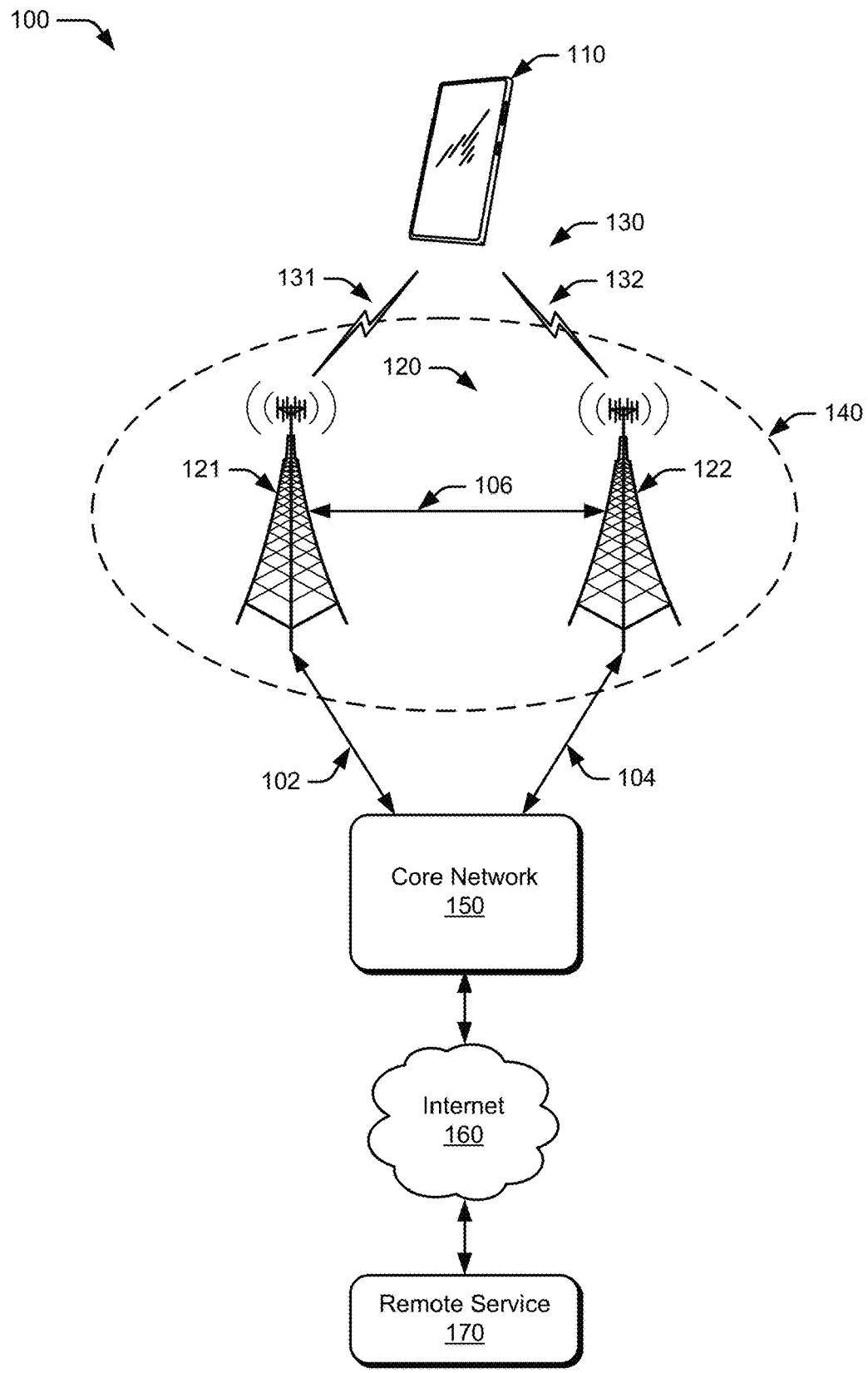
FIG. 1 illustrates an example environment in which various aspects of machine-learning architectures for simultaneous connection to multiple carriers can be implemented.

In conventional wireless communication systems, transmitter and receiver processing chains include complex functionality. For instance, a channel estimation block in the processing chain estimates or predicts how a signal distorts while propagating through a transmission environment. As another example, channel equalizer blocks reverse the signal distortions identified by the channel estimation block. These complex functions oftentimes become more complicated when processing higher frequency ranges, such as 5G mmW signals that are at or around the 6 GHz band.

DNNs provide alternative solutions to complex processing, such as the complex functionality used in a wireless communication system. By training a DNN on transmitter and/or receiver processing chain operations, the DNN can replace conventional functionality in a variety of ways, such as by replacing some or all of the conventional processing blocks used to transmit communication signals using carrier aggregation, replacing individual processing chain blocks, etc. Dynamic reconfiguration of a DNN, such as by modifying various parameter configurations (e.g., coefficients, layer connections, kernel sizes) also provides an ability to adapt to changing operating conditions.

This document describes aspects of machine-learning architectures for simultaneous connection to multiple carriers. In implementations, a network entity associated with a wireless communication system determines at least one deep neural network (DNN) configuration for processing information exchanged with a user equipment (UE) over a wireless communication system using carrier aggregation that includes at least a first component carrier and a second component carrier. At times, the at least one DNN configuration includes a first portion for forming a first DNN at the network entity, and a second portion for forming a second DNN at the UE. The network entity forms the first DNN based on the first portion and communicates an indication of the second portion to the UE. The network entity directs the UE to form the second DNN based on the second portion, and uses the first DNN to exchange, over the wireless communication system, the information with the UE using the carrier aggregation.

Aspects of machine-learning architectures for simultaneous connection to multiple carriers include a user equipment (UE) associated with a wireless communication system. In implementations, the UE receives an indication of at least one deep neural network (DNN) configuration for processing information exchanged over the wireless communication system using carrier aggregation that includes at least a first component carrier and a second component carrier. The UE forms, based on the indication, at least one DNN. The UE then uses the at least one DNN to process the information exchanged over the wireless communication system using the carrier aggregation.

Using DNN(s) to process information exchanged over a wireless communication system using multiple component carriers, such as through carrier aggregation, allows various devices operating in the wireless communication system to correct for changes in a current operating condition, such as transmission environment changes or component carrier changes. Alternately or additionally, the DNN(s) can be formed based upon capabilities of a UE or base station participating in the multiple component carrier communications. Configuring the DNNs based on the component carriers, device capabilities, current operating conditions, and so forth, improves an overall performance (e.g., lower bit errors, improved signal quality, improved latency) of how the devices transmit and recover the information. Further, DNNs can be trained to process complex input that corresponds to a complex environment, such a complex environment that correspond to transmitting and recovering information using multiple component carriers, such as offline training performed by a manufacturer of wireless devices or online training performed at a base station or core network server. Training the DNNs on these variations (e.g., a variety of component carrier combinations, different operating environments, different device capabilities) also provides a flexible and modifiable solution to complex processing as the transmission environment and participating devices change.

The phrases "transmitted over," "communications exchanged," and "communications associated with" include generating communications to be transmitted over the wireless communication system (e.g. processing pre-transmission communications) and/or processing communications received over the wireless communication system. Thus, "processing communications transmitted over the wireless communication system," "communications exchanged over the wireless communication system," as well as "communications associated with the wireless communication system" include generating the transmissions (e.g., pre-transmission processing), processing received transmissions, or any combination thereof.

Example Environment

FIG. 1 illustrates an example environment 100 which includes a user equipment 110 (UE 110) that can communicate with base stations 120 (illustrated as base stations 121 and 122) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, and the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2AP) through an X2 interface, at 106, to exchange user-plane and control-plane data. The UE 110 may connect, via the core network 150, to public networks, such as the Internet 160 to interact with a remote service 170. The remote service 170 represents the computing, communication, and storage devices used to provide any of a multitude of services including interactive voice or video communication, file transfer, streaming voice or video, and other technical services implemented in any manner such as voice calls, video calls, website access, messaging services (e.g., text messaging or multi-media messaging), photo file transfer, enterprise software applications, social media applications, video-gaming, streaming video services, and podcasts.

Example Devices

Figure 2:
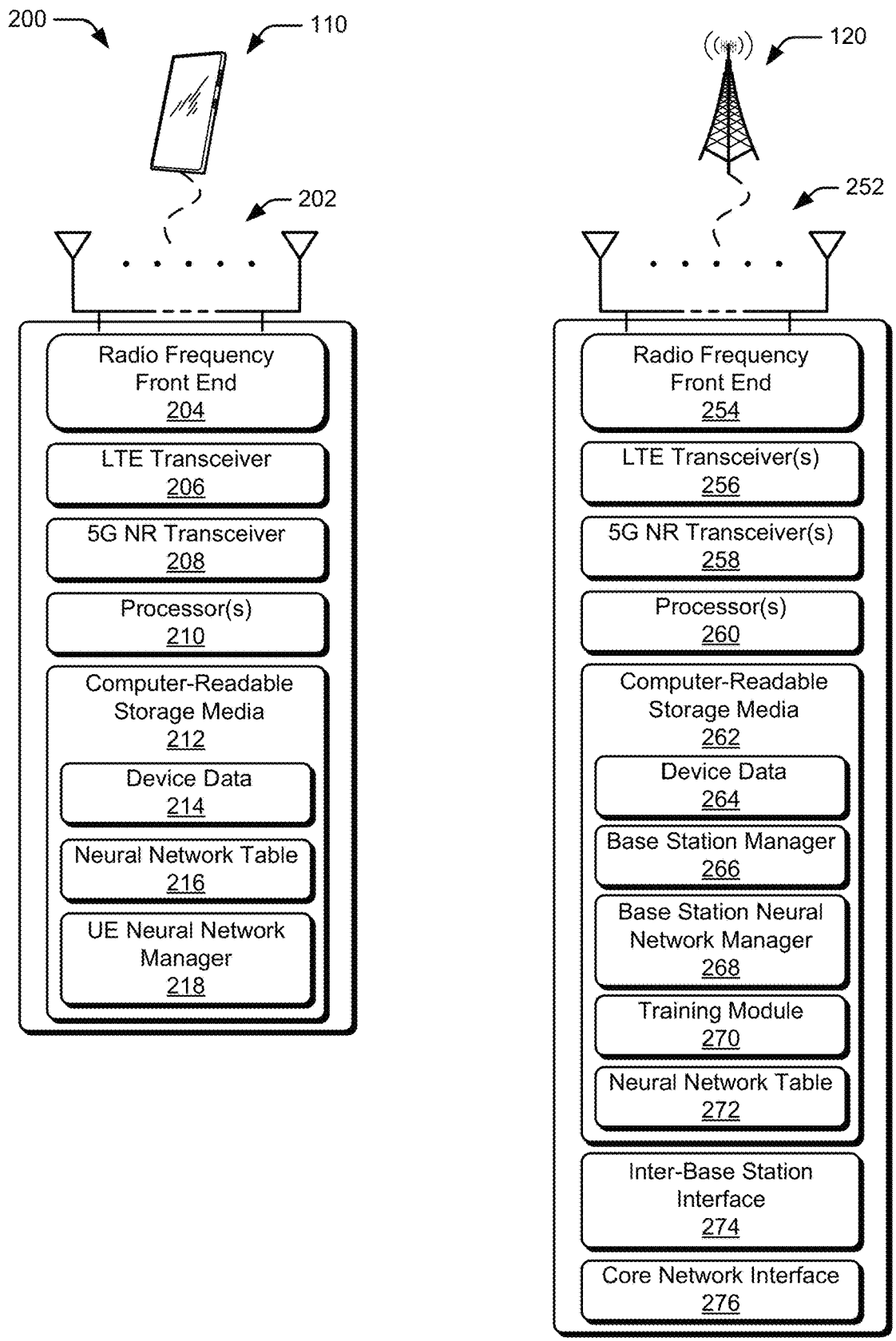
FIG. 2 illustrates an example device diagram of devices that can implement various aspects of machine-learning architectures for simultaneous connection to multiple carriers.
Figure 3:
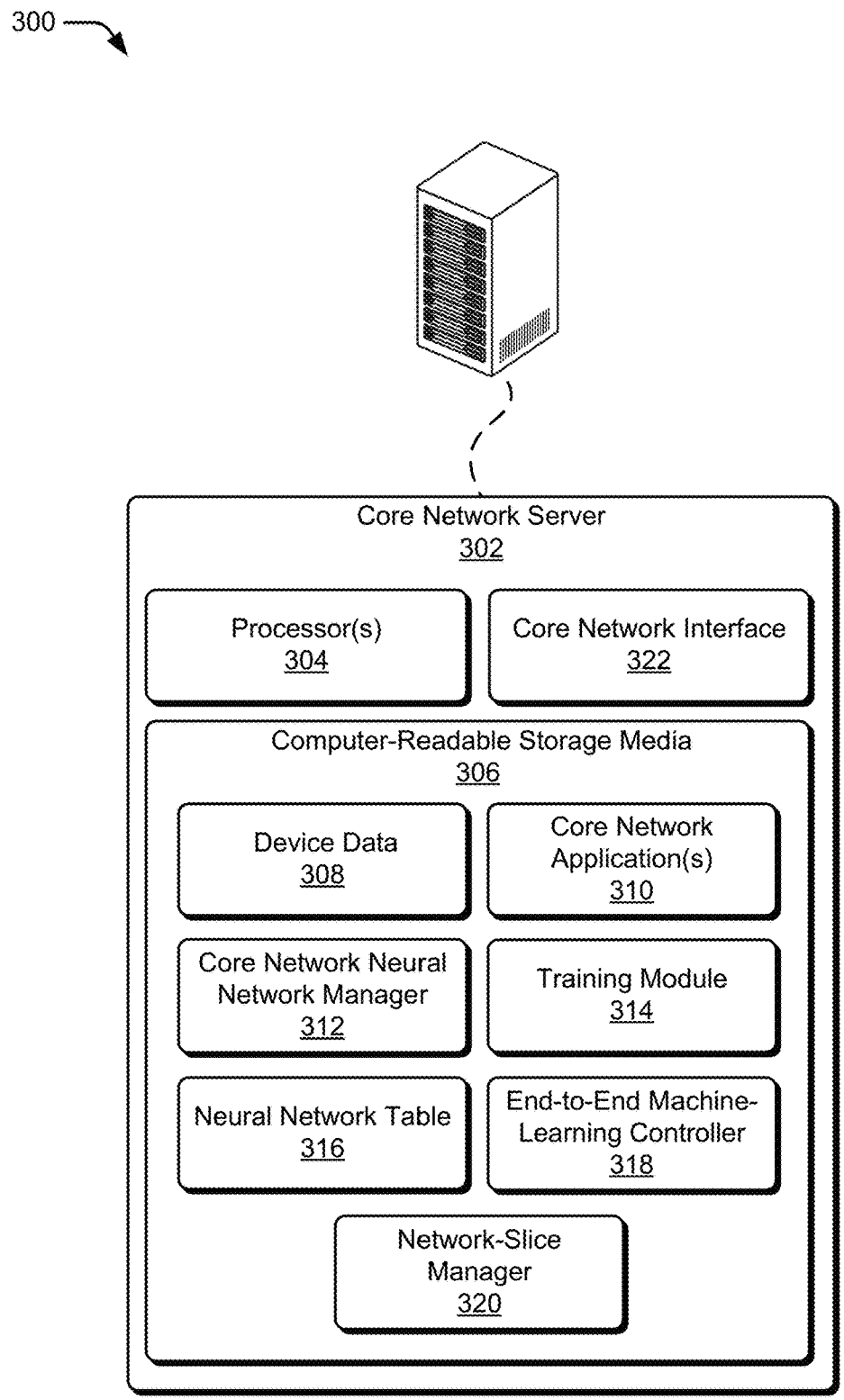
FIG. 3 illustrates an example device diagram of a device that can implement various aspects of machine-learning architectures for simultaneous connection to multiple carriers.

FIG. 2 illustrates an example device diagram 200 of the UE 110 and one of the base stations 120. FIG. 3 illustrates an example device diagram 300 of a core network server 302. The UE 110, the base station 120, and/or the core network server 302 may include additional functions and interfaces that are omitted from FIG. 2 or FIG. 3 for the sake of clarity.

The UE 110 includes antennas 202, a radio frequency front end 204 (RF front end 204), a wireless transceiver (e.g., an LTE transceiver 206, and/or a 5G NR transceiver 208) for communicating with the base station 120 in the RAN 140. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base station 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

The UE 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beam-forming codebooks, applications, neural network tables, and/or an operating system of the UE 110, which are executable by processor(s) 210 to enable user-plane communication, control-plane signaling, and user interaction with the UE 110.

In some implementations, the computer-readable storage media 212 includes a neural network table 216 that stores various architecture and/or parameter configurations that form a neural network, such as, by way of example and not of limitation, parameters that specify a fully-connected layer neural network architecture, a convolutional layer neural network architecture, a recurrent neural network layer, a number of connected hidden neural network layers, an input layer architecture, an output layer architecture, a number of nodes utilized by the neural network, coefficients (e.g., weights and biases) utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network table 216 includes any combination of NN formation configuration elements (e.g., architecture and/or parameter configurations) that can be used to create a NN formation configuration (e.g., a combination of one or more NN formation configuration elements) that defines and/or forms a DNN. In some implementations, a single index value of the neural network table 216 maps to a single NN formation configuration element (e.g., a 1:1 correspondence). Alternately or additionally, a single index value of the neural network table 216 maps to a NN formation configuration (e.g., a combination of NN formation configuration elements). In some implementations, the neural network table includes input characteristics for each NN formation configuration element and/or NN formation configuration, where the input characteristics describe properties about the training data used to generate the NN formation configuration element and/or NN formation configuration as further described.

In some implementations, the CRM 212 may also include a user equipment neural network manager 218 (UE neural network manager 218). Alternately or additionally, the UE neural network manager 218 may be implemented in whole or part as hardware logic or circuitry integrated with or separate from other components of the UE 110. The UE neural network manager 218 accesses the neural network table 216, such as by way of an index value, and forms a DNN using the NN formation configuration elements specified by a NN formation configuration. In implementations, UE neural network manager forms multiple DNNs to process wireless communications (e.g., downlink communications and/or uplink communications exchanged with the base station 120).

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 include antennas 252, a radio frequency front end 254 (RF front end 254), one or more wireless transceivers (e.g. one or more LTE transceivers 256, and/or one or more 5G NR transceivers 258) for communicating with the UE 110. The RF front end 254 of the base station 120 can couple or connect the LTE transceivers 256 and the 5G NR transceivers 258 to the antennas 252 to facilitate various types of wireless communication. The antennas 252 of the base station 120 may include an array of multiple antennas that are configured similar to, or different from, each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-Multiple-In, Multiple Out (Massive-MIMO), for the transmission and reception of communications with the UE 110.

The base station 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base station 120. In at least some aspects, the base station manager 266 configures the LTE transceivers 256 and the 5G NR transceivers 258 for communication with the UE 110, as well as communication with a core network, such as the core network 150.

CRM 262 also includes a base station neural network manager 268 (BS neural network manager 268). Alternately or additionally, the BS neural network manager 268 may be implemented in whole or part as hardware logic or circuitry integrated with or separate from other components of the base station 120. In at least some aspects, the BS neural network manager 268 selects the NN formation configurations utilized by the base station 120 and/or UE 110 to configure deep neural networks for processing wireless communications, such as by selecting a combination of NN formation configuration elements. In some implementations, the BS neural network manager receives feedback from the UE 110, and selects the neural network formation configuration based on the feedback. Alternately or additionally, the BS neural network manager 268 receives neural network formation configuration directions from core network 150 elements through a core network interface 276 or an inter-base station interface 274 and forwards the neural network formation configuration directions to UE 110. At times, the BS neural network manager 268 selects one or more NN formation configurations for processing communications exchanged using carrier aggregation, other multiple component carrier communications, and/or other split architecture implementations.

CRM 262 includes training module 270 and neural network table 272. In implementations, the base station 120 manage and deploy NN formation configurations to UE 110. Alternately or additionally, the base station 120 maintain the neural network table 272. The training module 270 teaches and/or trains DNNs using known input data. For instance, the training module 270 trains DNN(s) for different purposes, such as processing communications transmitted over a wireless communication system (e.g., encoding downlink communications, modulating downlink communications, demodulating downlink communications, decoding downlink communications, encoding uplink communications, modulating uplink communications, demodulating uplink communications, decoding uplink communications). This includes training the DNN(s) offline (e.g., while the DNN is not actively engaged in processing the communications) and/or online (e.g., while the DNN is actively engaged in processing the communications).

In implementations, the training module 270 extracts learned parameter configurations from the DNN to identify the NN formation configuration elements and/or NN formation configuration, and then adds and/or updates the NN formation configuration elements and/or NN formation configuration in the neural network table 272. The extracted parameter configurations include any combination of information that defines the behavior of a neural network, such as node connections, coefficients, active layers, weights, biases, pooling, etc.

The neural network table 272 stores multiple different NN formation configuration elements and/or NN formation configurations generated using the training module 270. In some implementations, the neural network table includes input characteristics for each NN formation configuration element and/or NN formation configuration, where the input characteristics describe properties about the training data used to generate the NN formation configuration element and/or NN formation configuration. For instance, the input characteristics includes, by way of example and not of limitation, power information, signal-to-interference-plus-noise ratio (SINR) information, channel quality indicator (CQI) information, channel state information (CSI), Doppler feedback, frequency bands, BLock Error Rate (BLER), Quality of Service (QoS), Hybrid Automatic Repeat reQuest (HARD) information (e.g., first transmission error rate, second transmission error rate, maximum retransmissions), latency, Radio Link Control (RLC), Automatic Repeat reQuest (ARQ) metrics, received signal strength (RSS), uplink SINR, timing measurements, error metrics, UE capabilities, base station capabilities (BS capabilities), power mode, Internet Protocol (IP) layer throughput, end2end latency, end2end packet loss ratio, etc. Accordingly, the input characteristics include, at times, Layer 1, Layer 2, and/or Layer 3 metrics. In some implementations, a single index value of the neural network table 272 maps to a single NN formation configuration element (e.g., a 1:1 correspondence). Alternately or additionally, a single index value of the neural network table 272 maps to a NN formation configuration (e.g., a combination of NN formation configuration elements).

In implementations, the base station 120 synchronizes the neural network table 272 with the neural network table 216 such that the NN formation configuration elements and/or input characteristics stored in one neural network table is replicated in the second neural network table. Alternately or additionally, the base station 120 synchronizes the neural network table 272 with the neural network table 216 such that the NN formation configuration elements and/or input characteristics stored in one neural network table represent complementary functionality in the second neural network table (e.g., NN formation configuration elements for transmitter path processing in the first neural network table, NN formation configuration elements for receiver path processing in the second neural network table).

The base station 120 also include an inter-base station interface 274, such as an Xn and/or X2 interface, which the base station manager 266 configures to exchange user-plane, control-plane, and other information between other base station 120, to manage the communication of the base station 120 with the UE 110. The base station 120 include a core network interface 276 that the base station manager 266 configures to exchange user-plane, control-plane, and other information with core network functions and/or entities.

In FIG. 3, the core network server 302 may provide all or part of a function, entity, service, and/or gateway in the core network 150. Each function, entity, service, and/or gateway in the core network 150 may be provided as a service in the core network 150, distributed across multiple servers, or embodied on a dedicated server. For example, the core network server 302 may provide the all or a portion of the services or functions of a User Plane Function (UPF), an Access and Mobility Management Function (AMF), a Serving Gateway (S-GW), a Packet Data Network Gateway (P-GW), a Mobility Management Entity (MME), an Evolved Packet Data Gateway (ePDG), and so forth. The core network server 302 is illustrated as being embodied on a single server that includes processor(s) 304 and computer-readable storage media 306 (CRM 306). The processor 304 may be a single core processor or a multiple core processor composed of a variety of materials, such as silicon, polysilicon, high-K dielectric, copper, and so on. CRM 306 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 308 of the core network server 302. The device data 308 includes data to support a core network function or entity, and/or an operating system of the core network server 302, which are executable by processor(s) 304.

CRM 306 also includes one or more core network applications 310, which, in one implementation, is embodied on CRM 306 (as shown). The one or more core network applications 310 may implement the functionality such as UPF, AMF, S-GW, P-GW, MME, ePDG, and so forth. Alternately or additionally, the one or more core network applications 310 may be implemented in whole or part as hardware logic or circuitry integrated with or separate from other components of the core network server 302.

CRM 306 also includes a core network neural network manager 312 that manages NN formation configurations used to process communications exchanged between UE 110 and the base stations 120. In some implementations, the core network neural network manager 312 analyzes various parameters, such as current signal channel conditions (e.g., as reported by base stations 120, as reported by other wireless access points, as reported by UEs 110 (via base stations or other wireless access points)), capabilities at base stations 120 (e.g., antenna configurations, cell configurations, Multiple-In, Multiple-Out (MIMO), capabilities, radio capabilities, processing capabilities), capabilities of UE 110 (e.g., antenna configurations, MIMO capabilities, radio capabilities, processing capabilities), and so forth. For example, the base stations 120 obtain the various parameters during the communications with the UE and forward the parameters to the core network neural network manager 312. The core network neural network manager selects, based on these parameters, a NN formation configuration that improves the accuracy of a DNN processing the communications. Improving the accuracy signifies an improved accuracy in the output, such as lower bit errors, generated by the neural network relative to a neural network configured with another NN formation configuration. The core network neural network manager 312 then communicates the selected NN formation configuration to the base stations 120 and/or the UE 110. In implementations, the core network neural network manager 312 receives UE and/or BS feedback from the base station 120 and selects an updated NN formation configuration based on the feedback. Alternately or additionally, the core network neural network manager 312 selects one or more NN formation configurations for processing communications exchanged using carrier aggregation, other multiple component carrier communications, and/or other split architecture implementations.

CRM 306 includes training module 314 and neural network table 316. In implementations, the core network server 302 manages and deploys NN formation configurations to multiple devices in a wireless communication system, such as UEs 110 and base stations 120. Alternately or additionally, the core network server maintains the neural network table 316 outside of the CRM 306. The training module 314 teaches and/or trains DNNs using known input data. For instance, the training module 314 trains DNN(s) to process different types of pilot communications transmitted over a wireless communication system. This includes training the DNN(s) offline and/or online. In implementations, the training module 314 extracts a learned NN formation configuration and/or learned NN formation configuration elements from the DNN and stores the learned NN formation configuration elements in the neural network table 316. Thus, a NN formation configuration includes any combination of architecture configurations (e.g., node connections, layer connections) and/or parameter configurations (e.g., weights, biases, pooling) that define or influence the behavior of a DNN. In some implementations, a single index value of the neural network table 316 maps to a single NN formation configuration element (e.g., a 1:1 correspondence). Alternately or additionally, a single index value of the neural network table 316 maps to a NN formation configuration (e.g., a combination of NN formation configuration elements).

In some implementations, the training module 314 of the core network neural network manager 312 generates complementary NN formation configurations and/or NN formation configuration elements to those stored in the neural network table 216 at the UE 110 and/or the neural network table 272 at the base station 121. As one example, the training module 314 generates neural network table 316 with NN formation configurations and/or NN formation configuration elements that have a high variation in the architecture and/or parameter configurations relative to medium and/or low variations used to generate the neural network table 272 and/or the neural network table 216. For instance, the NN formation configurations and/or NN formation configuration elements generated by the training module 314 correspond to fully-connected layers, a full kernel size, frequent sampling and/or pooling, high weighting accuracy, and so forth. Accordingly, the neural network table 316 includes, at times, high accuracy neural networks at the trade-off of increased processing complexity and/or time.

The NN formation configurations and/or NN formation configuration elements generated by the training module 270 have, at times, more fixed architecture and/or parameter configurations (e.g., fixed connection layers, fixed kernel size, etc.), and less variation, relative to those generated by the training module 314. The training module 270, for example, generates streamlined NN formation configurations (e.g., faster computation times, less data processing), relative to those generated by the training module 314, to optimize or improve a performance of end2end network communications at the base station 121 and/or the UE 110. Alternately or additionally, the NN formation configurations and/or NN formation configuration elements stored at the neural network table 216 at the UE 110 include more fixed architecture and/or parameter configurations, relative to those stored in the neural network table 316 and/or the neural network table 272, that reduce requirements (e.g., computation speed, less data processing points, less computations, less power consumption, etc.) at the UE 110 relative to the base station 121 and/or the core network server 302. In implementations, the variations in fixed (or flexible) architecture and/or parameter configurations at each neural network are based on the processing resources (e.g., processing capabilities, memory constraints, quantization constraints (e.g., 8-bit vs. 16-bit), fixed-point vs. floating point computations, floating point operations per second (FLOPS), power availability) of the devices targeted to form the corresponding DNNs. Thus, UEs or access points with less processing resources relative to a core network server or base station receive NN formation configurations optimized for the available processing resources.

The neural network table 316 stores multiple different NN formation configuration elements generated using the training module 314. In some implementations, the neural network table includes input characteristics for each NN formation configuration element and/or NN formation configuration, where the input characteristics describe properties about the training data used to generate the NN formation configuration. For instance, the input characteristics can include power information, SINR information, CQI, CSI, Doppler feedback, RSS, error metrics, minimum end-to-end (E2E) latency, desired E2E latency, E2E QoS, E2E throughput, E2E packet loss ratio, cost of service, etc.

CRM 306 also includes an end-to-end machine-learning controller 318 (E2E ML controller 318). The E2E ML controller 318 determines an end-to-end machine-learning configuration (E2E ML configuration) for processing information exchanged through an E2E communication, such as a QoS flow. In implementations, the E2E ML controller analyzes any combination of ML capabilities (e.g., supported ML architectures, supported number of layers, available processing power, memory limitations, available power budget, fixed-point processing vs. floating point processing, maximum kernel size capability, computation capability) of devices participating in the E2E communication. Alternately or additionally, the E2E ML controller analyzes any combination of QoS requirements, QoS parameters, and/or QoS characteristics to determine an E2E ML configuration that satisfies the associated requirements, parameters, and/or characteristics. In some implementations, the E2E ML controller obtains metrics that characterize a current operating environment and analyzes the current operating environment to determine the E2E ML configuration. This includes determining an E2E ML configuration that includes an architecture configuration in combination with parameter configuration(s) that define a DNN or determining an E2E ML configuration that simply includes parameter configurations used to update the DNN.

In determining the E2E ML configuration, the E2E ML controller sometimes determines a partitioned E2E ML configuration that distributes the processing functionality associated with the E2E ML configuration across multiple devices. For clarity, FIG. 3 illustrates the end-to-end machine-learning controller 318 as separate from the core network neural network manager 312, but in alternate or additional implementations, the core network neural network manager 312 includes functionality performed by the end-to-end machine-learning controller 318 or vice versa. Further, while FIG. 3 illustrates the core network server 302 implementing the E2E ML controller 318, alternate or additional devices can implement the E2E ML controller, such as the base station 120 and/or other network elements.

The core network server 302 also includes a network-slice manager 320. Generally speaking, the network-slice manager 320 partitions network resources (e.g., physical hardware, physical spectrum, logical channels, network functions, services provided, quality of service, latency) to determine and generate network slices that provide different quality-of-service flows through the wireless communication network (e.g., provide different quality-of-service flows between at least one UE 110, at least one base station 120, and the core network 150). At times, the network-slice manager 320 works in conjunction with the E2E ML controller 318 to determine the partitions to the network resources and provide communication exchanges that meet or exceed a quality-of-service level. For example, the quality-of-service level can be specified through one or more quality-of-service parameters, such as latency, throughput (e.g., bandwidth or data rate), reliability, or an error rate (e.g., a bit error rate). Other example quality-of-service parameters include availability, packet loss, or jitter. In addition to the quality-of-service level, the network slice can also provide a particular level of security through cryptography. In some implementations, the network-slice manager 320 associates each network slice with one or more end-to-end machine-learning architectures to provide the quality-of-service level. For clarity, FIG. 3 illustrates the network-slice manager 320 as separate from the core network neural network manager 312 and the E2E ML controller 318, but in alternate or additional implementations, the core network neural network manager 312 and/or the E2E ML controller 318 include the functionality performed by the network-slice manager 320 or vice versa. Further, while FIG. 3 illustrates the core network server 302 implementing the network-slice manager 320, alternate or additional devices can implement the network-slice manager 320, such as the base station 120 and/or other network elements.

The core network server 302 also includes a core network interface 322 for communication of user-plane, control-plane, and other information with the other functions or entities in the core network 150, base stations 120, or UE 110. In implementations, the core network server 302 communicates NN formation configurations to the base station 120 using the core network interface 322. The core network server 302 alternately or additionally receives feedback from the base stations 120 and/or the UE 110, by way of the base stations 120, using the core network interface 322.

Having described an example environment and example devices that can be utilized for neural network formation configuration feedback in wireless communications, consider now a discussion of configurable machine-learning modules that is in accordance with one or more implementations.

Configurable Machine-Learning Modules

Figure 4:
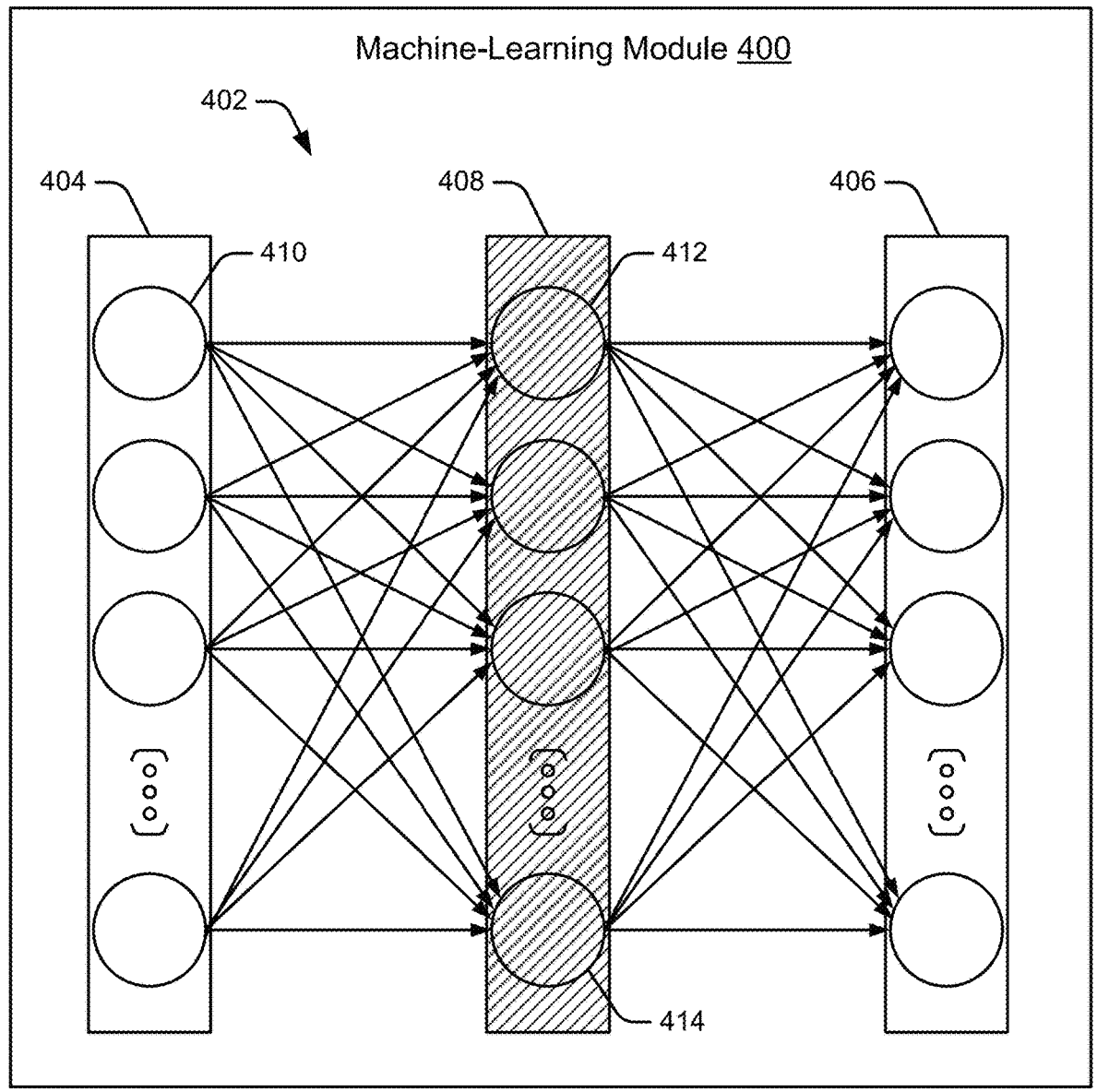
FIG. 4 illustrates an example machine-learning module that can implement various aspects of machine-learning architectures for simultaneous connection to multiple carriers.

FIG. 4 illustrates an example machine-learning module 400. The machine-learning module 400 implements a set of adaptive algorithms that learn and identify patterns within data. The machine-learning module 400 can be implemented using any combination of software, hardware, and/or firmware.

In FIG. 4, the machine-learning module 400 includes a deep neural network 402 (DNN 402) with groups of connected nodes (e.g., neurons and/or perceptrons) that are organized into three or more layers. The nodes between layers are configurable in a variety of ways, such as a partially-connected configuration where a first subset of nodes in a first layer are connected with a second subset of nodes in a second layer, a fully-connected configuration where each node in a first layer are connected to each node in a second layer, etc. A neuron processes input data to produce a continuous output value, such as any real number between 0 and 1. In some cases, the output value indicates how close the input data is to a desired category. A perceptron performs linear classifications on the input data, such as a binary classification. The nodes, whether neurons or perceptrons, can use a variety of algorithms to generate output information based upon adaptive learning. Using the DNN, the machine-learning module 400 performs a variety of different types of analysis, including single linear regression, multiple linear regression, logistic regression, step-wise regression, binary classification, multiclass classification, multi-variate adaptive regression splines, locally estimated scatterplot smoothing, and so forth.

In some implementations, the machine-learning module 400 adaptively learns based on supervised learning. In supervised learning, the machine-learning module 400 receives various types of input data as training data. The machine-learning module 400 processes the training data to learn how to map the input to a desired output. As one example, the machine-learning module 400 receives digital samples of a signal as input data and learns how to map the signal samples to binary data that reflects information embedded within the signal. As another example, the machine-learning module 400 receives binary data as input data and learns how to map the binary data to digital samples of a signal with the binary data embedded within the signal. During a training procedure, the machine-learning module 400 uses labeled or known data as an input to the DNN. The DNN analyzes the input using the nodes and generates a corresponding output. The machine-learning module 400 compares the corresponding output to truth data and adapts the algorithms implemented by the nodes to improve the accuracy of the output data. Afterwards, the DNN applies the adapted algorithms to unlabeled input data to generate corresponding output data.

The machine-learning module 400 uses statistical analyses and/or adaptive learning to map an input to an output. For instance, the machine-learning module 400 uses characteristics learned from training data to correlate an unknown input to an output that is statistically likely within a threshold range or value. This allows the machine-learning module 400 to receive complex input and identify a corresponding output. Some implementations train the machine-learning module 400 on characteristics of communications transmitted over a wireless communication system (e.g., time/frequency interleaving, time/frequency deinterleaving, convolutional encoding, convolutional decoding, power levels, channel equalization, inter-symbol interference, quadrature amplitude modulation/demodulation, frequency-division multiplexing/de-multiplexing, transmission channel characteristics). This allows the trained machine-learning module 400 to receive samples of a signal as an input, such as samples of a downlink signal received at a user equipment, and recover information from the downlink signal, such as the binary data embedded in the downlink signal.

In FIG. 4, the DNN includes an input layer 404, an output layer 406, and one or more hidden layer(s) 408 that are positioned between the input layer 404 and the output layer 406. Each layer has an arbitrary number of nodes, where the number of nodes between layers can be the same or different. In other words, input layer 404 can have a same number and/or different number of nodes as output layer 406, output layer 406 can have a same number and/or different number of nodes than hidden layer(s) 408, and so forth.

Node 410 corresponds to one of several nodes included in input layer 404, where the nodes perform independent computations from one another. As further described, a node receives input data, and processes the input data using algorithm(s) to produce output data. At times, the algorithm(s) include weights and/or coefficients that change based on adaptive learning. Thus, the weights and/or coefficients reflect information learned by the neural network. Each node can, in some cases, determine whether to pass the processed input data to the next node(s). To illustrate, after processing input data, node 410 can determine whether to pass the processed input data to node 412 and/or node 414 of hidden layer(s) 408. Alternately or additionally, node 410 passes the processed input data to nodes based upon a layer connection architecture. This process can repeat throughout multiple layers until the DNN generates an output using the nodes of output layer 406.

A neural network can also employ a variety of architectures that determine what nodes within the neural network are connected, how data is advanced and/or retained in the neural network, what weights and coefficients are used to process the input data, how the data is processed, and so forth. These various factors collectively describe a NN formation configuration. To illustrate, a recurrent neural network, such as a long short-term memory (LSTM) neural network, forms cycles between node connections in order to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, the NN formation configuration can include a variety of parameter configurations that influence how the neural network processes input data.

A NN formation configuration of a neural network can be characterized by various architecture and/or parameter configurations. To illustrate, consider an example in which the DNN implements a convolutional neural network. Generally, a convolutional neural network corresponds to a type of DNN in which the layers process data using convolutional operations to filter the input data. Accordingly, the convolutional NN formation configuration can be characterized with, by way of example and not of limitation, pooling parameter(s), kernel parameter(s), weights, and/or layer parameter(s).

A pooling parameter corresponds to a parameter that specifies pooling layers within the convolutional neural network that reduce the dimensions of the input data. To illustrate, a pooling layer can combine the output of nodes at a first layer into a node input at a second layer. Alternately or additionally, the pooling parameter specifies how and where in the layers of data processing the neural network pools data. A pooling parameter that indicates "max pooling," for instance, configures the neural network to pool by selecting a maximum value from the grouping of data generated by the nodes of a first layer, and use the maximum value as the input into the single node of a second layer. A pooling parameter that indicates "average pooling" configures the neural network to generate an average value from the grouping of data generated by the nodes of the first layer and use the average value as the input to the single node of the second layer.

A kernel parameter indicates a filter size (e.g., a width and height) to use in processing input data. Alternately or additionally, the kernel parameter specifies a type of kernel method used in filtering and processing the input data. A support vector machine, for instance, corresponds to a kernel method that uses regression analysis to identify and/or classify data. Other types of kernel methods include Gaussian processes, canonical correlation analysis, spectral clustering methods, and so forth. Accordingly, the kernel parameter can indicate a filter size and/or a type of kernel method to apply in the neural network.

Weight parameters specify weights and biases used by the algorithms within the nodes to classify input data. In implementations, the weights and biases are learned parameter configurations, such as parameter configurations generated from training data.

A layer parameter specifies layer connections and/or layer types, such as a fully-connected layer type that indicates to connect every node in a first layer (e.g., output layer 406) to every node in a second layer (e.g., hidden layer(s) 408), a partially-connected layer type that indicates which nodes in the first layer to disconnect from the second layer, an activation layer type that indicates which filters and/or layers to activate within the neural network, and so forth. Alternately or additionally, the layer parameter specifies types of node layers, such as a normalization layer type, a convolutional layer type, a pooling layer type, etc.

While described in the context of pooling parameters, kernel parameters, weight parameters, and layer parameters, other parameter configurations can be used to form a DNN without departing from the scope of the claimed subject matter. Accordingly, a NN formation configuration can include any other type of parameter that can be applied to a DNN that influences how the DNN processes input data to generate output data.

Some implementations configure machine-learning module 400 based on a current operating environment. To illustrate, consider a machine-learning module trained to generate binary data from digital samples of a signal. A transmission environment oftentimes modifies the characteristics of a signal traveling through the environment. Transmission environments oftentimes change, which impacts how the environment modifies the signal. A first transmission environment, for instance, modifies a signal in a first manner, while a second transmission environment modifies the signal in a different manner than the first. These differences impact an accuracy of the output results generated by a machine-learning module. For instance, a neural network configured to process communications transmitted over the first transmission environment may generate errors when processing communications transmitted over the second transmission environment (e.g., bit errors that exceed a threshold value).

Various implementations generate and store NN formation configurations and/or NN formation configuration elements (e.g., various architecture and/or parameter configurations) for different transmission environments. Base stations 120 and/or core network server 302, for example, train the machine-learning module 400 using any combination of BS neural network manager 268, training module 270, core network neural network manager 312, and/or training module 314. The training can occur offline when no active communication exchanges are occurring, or online during active communication exchanges. For example, the base stations 120 and/or core network server 302 can mathematically generate training data, access files that store the training data, obtain real-world communications data, etc. The base stations 120 and/or core network server 302 then extract and store the various learned NN formation configurations in a neural network table. Some implementations store input characteristics with each NN formation configuration, where the input characteristics describe various properties of the transmission environment corresponding to the respective NN formation configuration. In implementations, a neural network manager selects a NN formation configuration and/or NN formation configuration element(s) by matching a current transmission environment and/or current operating environment to the input characteristics.

Having described configurable machine-learning modules, consider now a discussion of deep neural networks in wireless communication systems that is in accordance with one or more implementations.

Deep Neural Networks in Wireless Communication Systems

Wireless communication systems include a variety of complex components and/or functions, such as the various devices and modules described with reference to the example environment 100 of FIG. 1, the example device diagram 200 of FIG. 2, and the example device diagram 300 of FIG. 3. In some implementations, the devices participating in the wireless communication system chain together a series of functions to enable the exchange of information over wireless connections.

Figure 5:
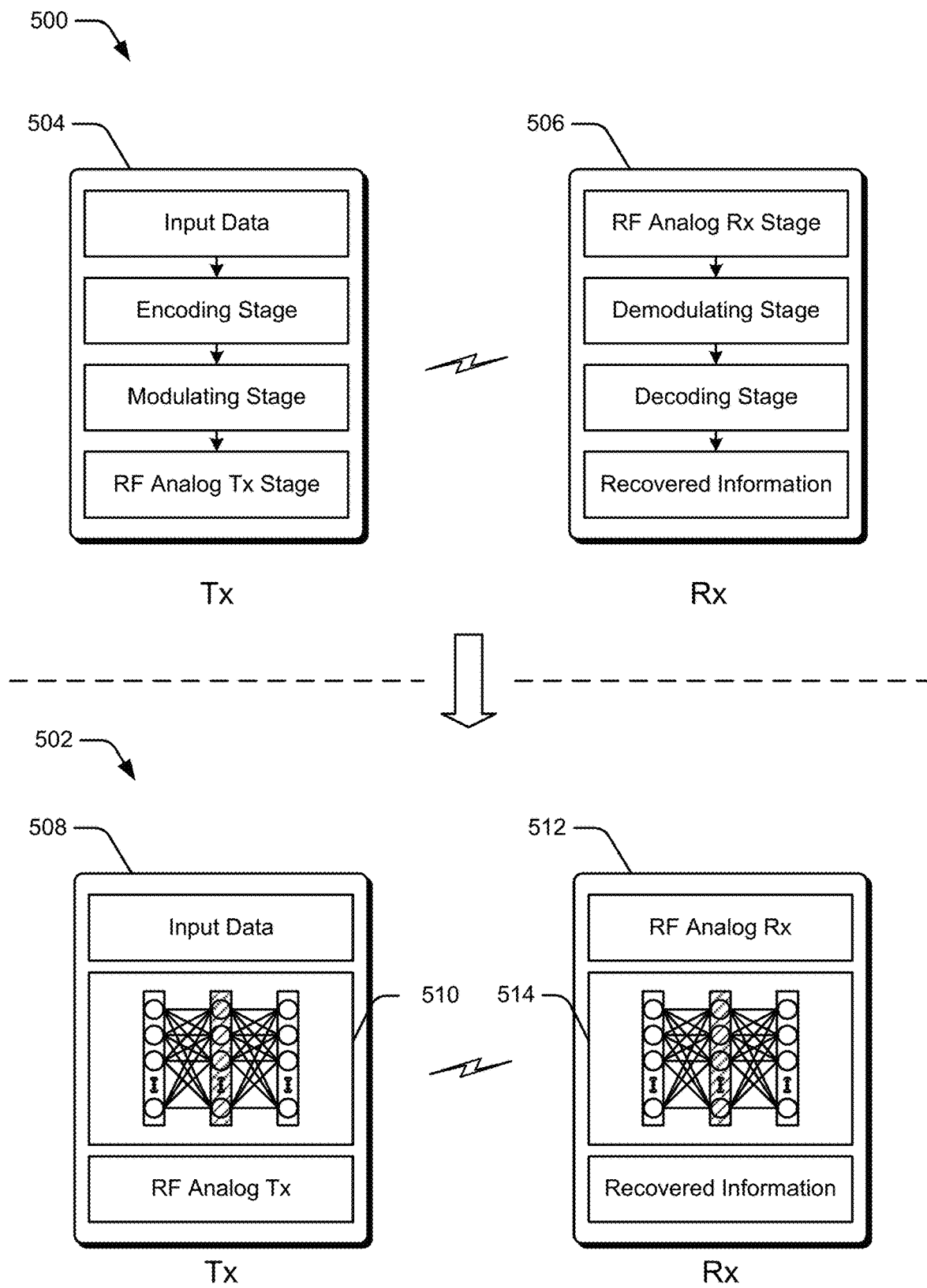
FIG. 5 illustrates example block diagrams of processing chains utilized by devices to process communications transmitted over a wireless communication system.

To demonstrate, FIG. 5 illustrates example block diagram 500 and example block diagram 502, each of which depicts an example processing chain utilized by devices in a wireless communication system. For simplicity, the block diagrams illustrate high-level functionality, but the block diagrams may include additional functions that are omitted from FIG. 5 for the sake of clarity.

In the upper portion of FIG. 5, block diagram 500 includes a transmitter block 504 and a receiver block 506. Transmitter block 504 includes a transmitter processing chain that progresses from top to bottom. The transmitter processing chain begins with input data that progresses to an encoding stage, followed by a modulating stage, and then a radio frequency (RF) analog transmit (Tx) stage. The encoding stage can include any type and number of encoding stages employed by a device to transmit data over the wireless communication system.

To illustrate, an encoding stage receives binary data as input, and processes the binary data using various encoding algorithms to append information to the binary data, such as frame information. Alternately or additionally, the encoding stage transforms the binary data, such as by applying forward error correction that adds redundancies to help information recovery at a receiver. As another example, the encoding stage converts the binary data into symbols.

An example modulating stage receives an output generated by the encoding stage as input and embeds the input onto a signal. For instance, the modulating stage generates digital samples of signal(s) embedded with the input from the encoding stage. Thus, in transmitter block 504, the encoding stage and the modulating stage represent a high-level transmitter processing chain that often includes lower-level complex functions, such as convolutional encoding, serial-to-parallel conversion, cyclic prefix insertion, channel coding, time/frequency interleaving, and so forth. The RF analog Tx stage receives the output from the modulating stage, generates an analog RF signal based on the modulating stage output, and transmits the analog RF signal to receiver block 506.

Receiver block 506 performs complementary processing relative to transmitter block 504 using a receiver processing chain. The receiver processing chain illustrated in receiver block 506 progresses from top to bottom and includes an RF analog receive (Rx) stage, followed by a demodulating stage, and a decoding stage.

The RF analog RX stage receives signals transmitted by the transmitter block 504, and generates a signal used by the demodulating stage. As one example, the RF analog Rx stage includes a down-conversion component and/or an analog-to-digital converter (ADC) to generate samples of the received signal. The demodulating stage processes input from the RF analog RX stage to extract data embedded on the signal (e.g., data embedded by the modulating stage of the transmitter block 504). The demodulating stage, for instance, recovers symbols and/or binary data.

The decoding stage receives input from the demodulating stage, such as recovered symbols and/or binary data, and processes the input to recover the transmitted information. To illustrate, the decoding stage corrects for data errors based on forward error correction applied at the transmitter block, extracts payload data from frames and/or slots, and so forth. Thus, the decoding stage generates the recovered information.

As noted, the transmitter and receiver processing chains illustrated by transmitter block 504 and receiver block 506 have been simplified for clarity and can include multiple complex modules. At times, these modules are specific to particular functions and/or conditions. Consider, for example, a receiver processing chain that processes Orthogonal Frequency Division Modulation (OFDM) transmissions. To recover information from OFDM transmissions, the receiver block 506 oftentimes includes multiple processing blocks, each dedicated to a particular function, such as an equalization block that corrects for distortion in a received signal, a channel estimation block that estimates transmission channel properties to identify the effects on a transmission due to scattering, power decay, and so forth. At high frequencies, such as 5G mmW signals in the 6 GHz band, these blocks can be computationally and/or monetarily expensive (e.g., require substantial processing power, require expensive hardware). Further, implementing blocks that generate outputs with an accuracy within a desired threshold oftentimes requires more specific and less flexible components. To illustrate, an equalization block that functions for 5G mmW signals in the 6 GHz band may not perform with the same accuracy at other frequency bands, thus necessitating different equalization blocks for different bands and adding complexity to the corresponding devices.

Some implementations include DNNs in the transmission and/or receiver processing chains. In block diagram 502, transmitter block 508 includes one or more deep neural network(s) 510 (DNNs 510) in the transmitter processing chain, while receiver block 512 includes one or more deep neural network(s) 514 (DNNs 514) in the receiver processing chain.

For simplicity, the DNNs 510 in the transmitter block 508 correspond to the encoding stage and the modulating stage of transmitter block 504. The DNNs 510, however, can perform any high-level and/or low-level operation found within the transmitter processing chain. For instance, a first DNN performs low-level transmitter-side forward error correction, a second DNN performs low-level transmitter-side convolutional encoding, and so forth. Alternately or additionally, the DNNs 510 perform high-level processing, such as end-to-end processing that corresponds to the encoding stage and the modulating stage of transmitter block 508.

In a similar manner, the DNNs 514 in receiver block 512 perform receiver processing chain functionality (e.g., demodulating stage, decoding stage). The DNNs 514 can perform any high-level and/or low-level operation found within the receiver processing chain, such as low-level receiver-side bit error correction, low-level receiver-side symbol recovery, high-level end-to-end demodulating and decoding, etc. Accordingly, DNNs 514 in wireless communication systems can be configured to replace high-level operations and/or low-level operations in transmitter and receiver processing chains. At times, the DNNs 514 performing the high-level operations and/or low-level operations can be configured and/or reconfigured based on a current operating environment as further described. This DNN reconfigurability, along with DNN coefficient updates, provides more flexibility and adaptability to the processing chains relative to the more specific and less flexible components.

Figure 6:
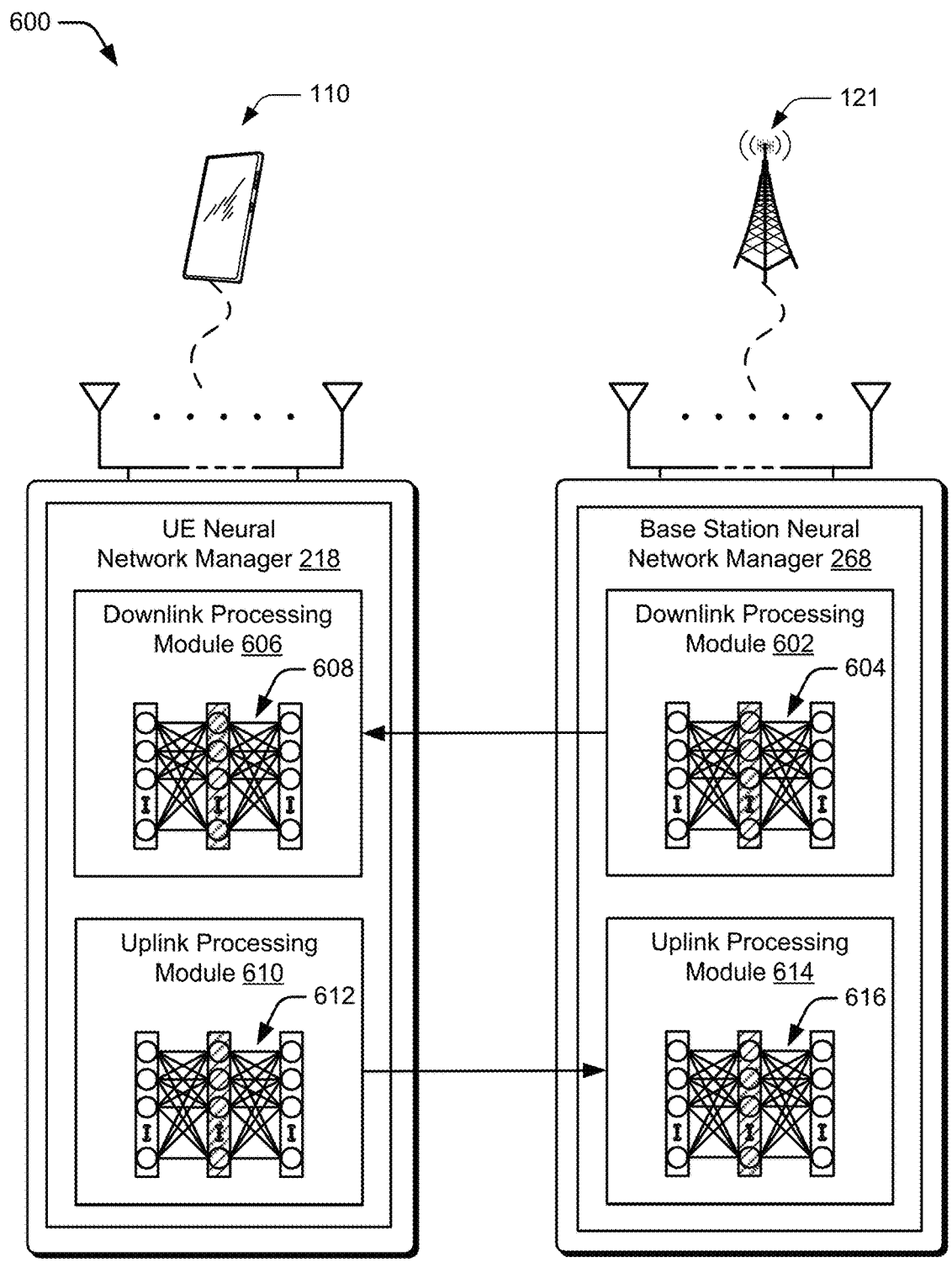
FIG. 6 illustrates an example operating environment in which multiple deep neural networks are utilized in a wireless communication system.

Some implementations process communication exchanges over the wireless communication system using multiple DNNs, where each DNN has a respective purpose (e.g., uplink processing, downlink processing, uplink encoding processing, downlink decoding processing, etc.). To demonstrate, FIG. 6 illustrates an example operating environment 600 that includes UE 110 and base station 120. In implementations, the UE 110 and base station 120 exchange communications with one another over a wireless communication system by processing the communications using multiple DNNs.

In FIG. 6, the base station neural network manager 268 of the base station 120 includes a downlink processing module 602 for processing downlink communications, such as for generating downlink communications transmitted to the UE 110. To illustrate, the base station neural network manager 268 forms deep neural network(s) 604 (DNNs 604) in the downlink processing module 602 using NN formation configurations as further described. In some examples, the DNNs 604 correspond to the DNNs 510 of FIG. 5. In other words, the DNNs 604 perform some or all of the transmitter processing functionality used to generate downlink communications.

Similarly, the UE neural network manager 218 of the UE 110 includes a downlink processing module 606, where the downlink processing module 606 includes deep neural network(s) 608 (DNNs 608) for processing (received) downlink communications. In various implementations, the UE neural network manager 218 forms the DNNs 608 using NN formation configurations. In FIG. 6, the DNNs 608 correspond to the DNNs 514 of FIG. 5, where the deep neural network(s) 606 of UE 110 perform some or all receiver processing functionality for (received) downlink communications. Accordingly, the DNNs 604 and the DNNs 608 perform complementary processing to one another (e.g., encoding/decoding, modulating/demodulating).

The DNNs 604 and/or DNNs 608 can include multiple deep neural networks, where each DNN is dedicated to a respective channel, a respective purpose, and so forth. The base station 120, as one example, processes downlink control channel information using a first DNN of the DNNs 604, processes downlink data channel information using a second DNN of the DNNs 604, and so forth. As another example, the UE 110 processes downlink control channel information using a first DNN of the DNNs 608, processes downlink data channel information using a second DNN of the DNNs 608, etc.

The base station 120 and/or the UE 110 also process uplink communications using DNNs. In environment 600, the UE neural network manager 218 includes an uplink processing module 610, where the uplink processing module 610 includes deep neural network(s) 612 (DNNs 612) for generating and/or processing uplink communications (e.g., encoding, modulating). In other words, uplink processing module 610 processes pre-transmission communications as part of processing the uplink communications. The UE neural network manager 218, for example, forms the DNNs 612 using NN formation configurations. At times, the DNNs 612 correspond to the DNNs 510 of FIG. 5. Thus, the DNNs 612 perform some or all of the transmitter processing functionality used to generate uplink communications transmitted from the UE 110 to the base station 120.

Similarly, uplink processing module 614 of the base station 120 includes deep neural network(s) 616 (DNNs 616) for processing (received) uplink communications, where base station neural network manager 268 forms DNNs 616 using NN formation configurations as further described. In examples, the DNNs 616 of the base station 120 correspond to the DNNs 514 of FIG. 5, and perform some or all receiver processing functionality for (received) uplink communications, such as uplink communications received from UE 110. At times, the DNNs 612 and the DNNs 616 perform complementary functionality of one another. Alternately or additionally, the uplink processing module 610 and/or the uplink processing module 614 include multiple DNNs, where each DNN has a dedicated purpose (e.g., processes a respective channel, performs respective uplink functionality, and so forth). FIG. 6 illustrates the DNNs 604, 608, 612, and 616 as residing within the respective neural network managers to signify that the neural network managers form the DNNs, however, the DNNs can be formed external to the neural network managers (e.g., UE neural network manager 218 and base station neural network manager 268) within different components, processing chains, modules, etc.

Having described deep neural networks in wireless communication systems, consider now a discussion of signaling and control transactions over a wireless communication system that can be used to configure deep neural networks for downlink and uplink communications that is in accordance with one or more implementations.

Signaling and Control Transactions to Configure Deep Neural Networks

Figure 7:
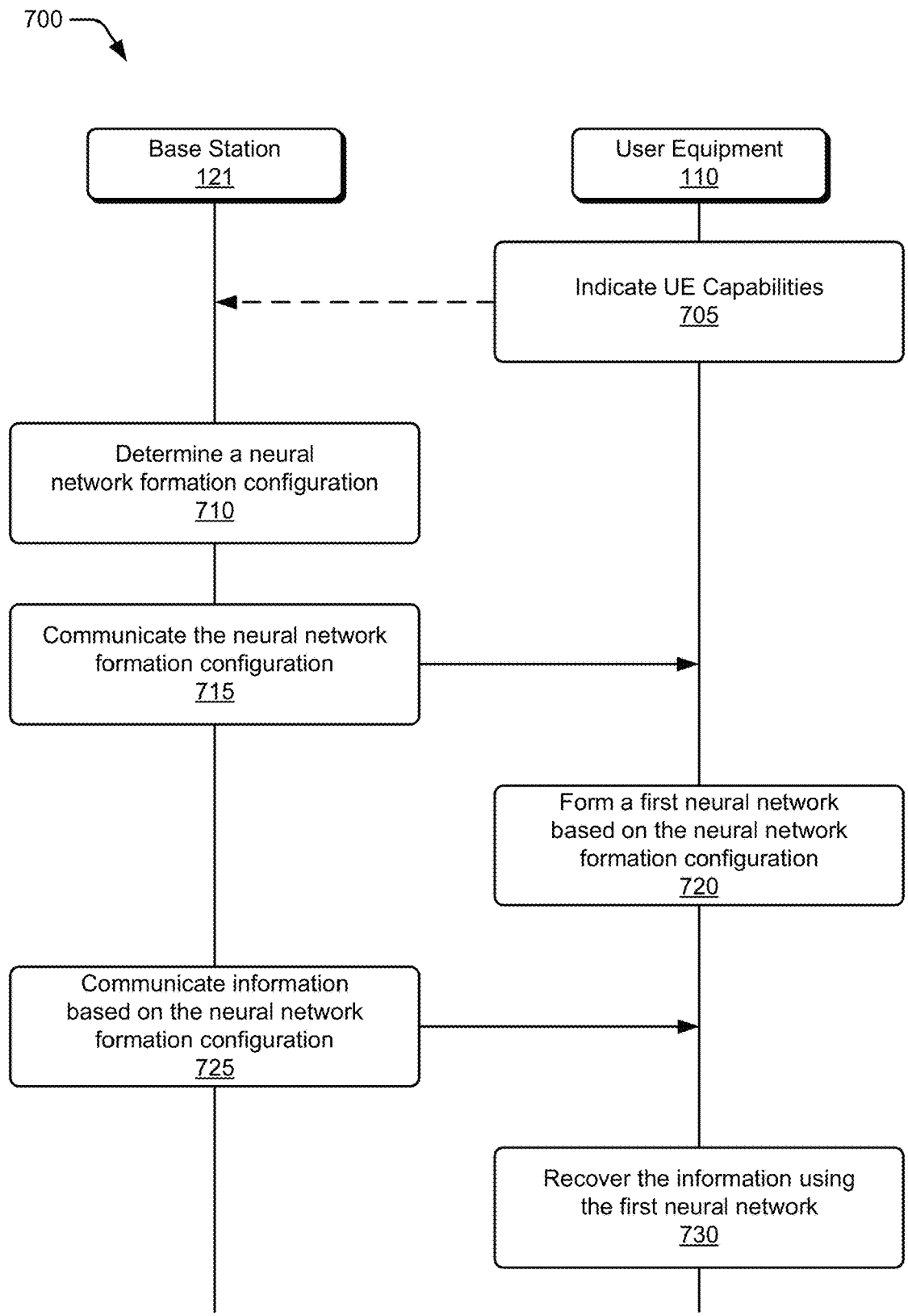
FIG. 7 illustrates an example transaction diagram between various devices for configuring a neural network using a neural network formation configuration.

FIG. 7 illustrates an example signaling and control transaction diagram 700 between a base station and a user equipment in accordance with one or more aspects of neural network formation configurations in wireless communication. Alternate or additional implementations include transactions that include a core network server. For example, the core network server 302 performs, in some implementations, various signaling and control actions performed by the base station 120 as illustrated by FIG. 7. The signaling and control transactions may be performed by the base station 120 and the UE 110 of FIG. 1 using elements of FIGS. 1-6. For clarity, FIG. 7 omits the core network server 302, but alternate implementations include the core network server as further described.

As illustrated, at 705, the UE 110 optionally indicates UE capabilities (e.g., capabilities supported by the UE) to a network entity, such as the base station 120. In some implementations, the UE capabilities include ML-related capabilities, such as a maximum kernel size capability, a memory limitation, a computation capability, supported ML architectures, supported number of layers, available processing power, memory limitation, available power budget, and fixed-point processing versus floating point processing. At times, the base station forwards the UE capabilities to a core network server (e.g., the core network server 302).

At 710 the base station 120 determines a neural network formation configuration. In determining the neural network formation configuration, the base station analyzes any combination of information, such as a channel type being processed by the deep neural network (e.g., downlink, uplink, data, control, etc.), transmission medium properties (e.g., power measurements, signal-to-interference-plus-noise ratio (SINR) measurements, channel quality indicator (CQI) measurements), encoding schemes, UE capabilities, BS capabilities, and so forth. In some implementations, the base station 120 determines the neural network formation configuration based upon the UE capabilities indicated at 705. Alternately or additionally, the base station 120 obtains the UE capabilities from a networked storage device, such as a server. In some implementations, the core network server 302 determines the neural network formation configuration in manner(s) similar to that described with respect to the base station, and communicates the determined neural network formation configuration to the base station.

The base station 120, for instance, receives message(s) from the UE 110 (not shown) that indicates one or more capabilities of the UE, such as, by way of example and not of limitation, connectivity information, dual connectivity information, carrier aggregation capabilities, downlink physical parameter values, uplink physical parameter values, supported downlink/uplink categories, inter-frequency handover, and ML-capabilities (e.g., a maximum kernel size capability, a memory limitation, a computation capability, supported ML architectures, supported number of layers, available processing power, memory limitation, available power budget, fixed-point processing vs. floating point processing). The base station 120 (and/or the core network server 302) identifies, from the message(s), the UE capabilities that impact how the UE processes communications, and/or how the base station processes communications from the UE and selects a neural network formation configuration with improved output accuracy relative to other neural network formation configurations.

In some implementations, the base station 120 (and/or the core network server 302) selects the neural network formation configuration from multiple neural network formation configurations. Alternately or additionally, the base station 120 (and/or the core network server 302) selects the neural network formation configuration by selecting a subset of neural network architecture formation elements in a neural network table. At times, the base station 120 (and/or the core network server 302) analyzes multiple neural network formation configurations and/or multiple neural network formation configuration elements included in a neural network table, and determines the neural network formation configuration by selects and/or creates a neural network formation configuration that aligns with current channel conditions, such as by matching the channel type, transmission medium properties, etc., to input characteristics as further described. Alternately or additionally, the base station 120 (and/or the core network server 302) selects the neural network formation configuration based on network parameters, such as scheduling parameters (e.g., scheduling Multiple User, Multiple Input, Multiple Output (MU-MIMO) for downlink communications, scheduling MU-MIMO for uplink communications).

At 715, the base station 120 communicates the neural network formation configuration to the UE 110. Alternately or additionally, the core network server 302 communicates the neural network formation configuration to the base station 120, and the base station 120 forwards the neural network formation configuration to the UE 110. In some implementations, the base station transmits a message that specifies the neural network formation configuration, such as by transmitting a message that includes an index value that maps to an entry in a neural network table, such as neural network table 216 of FIG. 2. Alternately or additionally, the base station transmits a message that includes neural network parameter configurations (e.g., weight values, coefficient values, number of filters). In some cases, the base station 120 specifies a purpose and/or processing assignment in the message, where the processing assignment indicates what channels, and/or where in a processing chain, the configured neural network applies to, such as a downlink control channel processing, an uplink data channel processing, downlink decoding processing, uplink encoding processing, etc. Accordingly, the base station can communicate a processing assignment with a neural network formation configuration.

In some implementations, the base station 120 communicates multiple neural network formation configurations to the UE 110. For example, the base station transmits a first message that directs the UE to use a first neural network formation configuration for uplink encoding, and a second message that directs the UE to use a second neural network formation configuration for downlink decoding. In some scenarios, the base station 120 communicates multiple neural network formation configurations, and the respective processing assignments, in a single message. As yet another example, the base station communicates the multiple neural network formation configurations using different radio access technologies (RATs). The base station can, for instance, transmit a first neural network formation configuration for downlink communication processing to the UE 110 using a first RAT and/or carrier, and transmit a second neural network formation configuration for uplink communication processing to the UE 110 using a second RAT and/or carrier.

At 720, the UE 110 forms a first neural network based on the neural network formation configuration. For instance, the UE 110 accesses a neural network table using the index value(s) communicated by the base station to obtain the neural network formation configuration and/or the neural network formation configuration elements. Alternately or additionally, the UE 110 extracts neural network architecture and/or parameter configurations from the message. The UE 110 then forms the neural network using the neural network formation configuration, the extracted architecture and/or parameter configurations, etc. In some implementations, the UE processes all communications using the first neural network, while in other implementations, the UE processes select communications using the first neural network based on a processing assignment (e.g., a downlink control channel processing assignment, an uplink data channel processing assignment, downlink decoding processing assignment, uplink encoding processing assignment).

At 725, the base station 120 communicates information based on the neural network formation configuration. For instance, with reference to FIG. 6, the base station 120 processes downlink communications using a second neural network configured with complementary functionality to the first neural network. In other words, the second neural network uses a second neural network formation configuration complementary to the neural network formation configuration. In turn, at 730, the UE 110 recovers the information using the first neural network.

Having described signaling and control transactions that can be used to configure neural networks for processing communications, consider now a discussion of generating and communicating neural network formation configurations that is in accordance with one or more implementations.

Generating and Communicating Neural Network Formation Configurations

Figure 8:
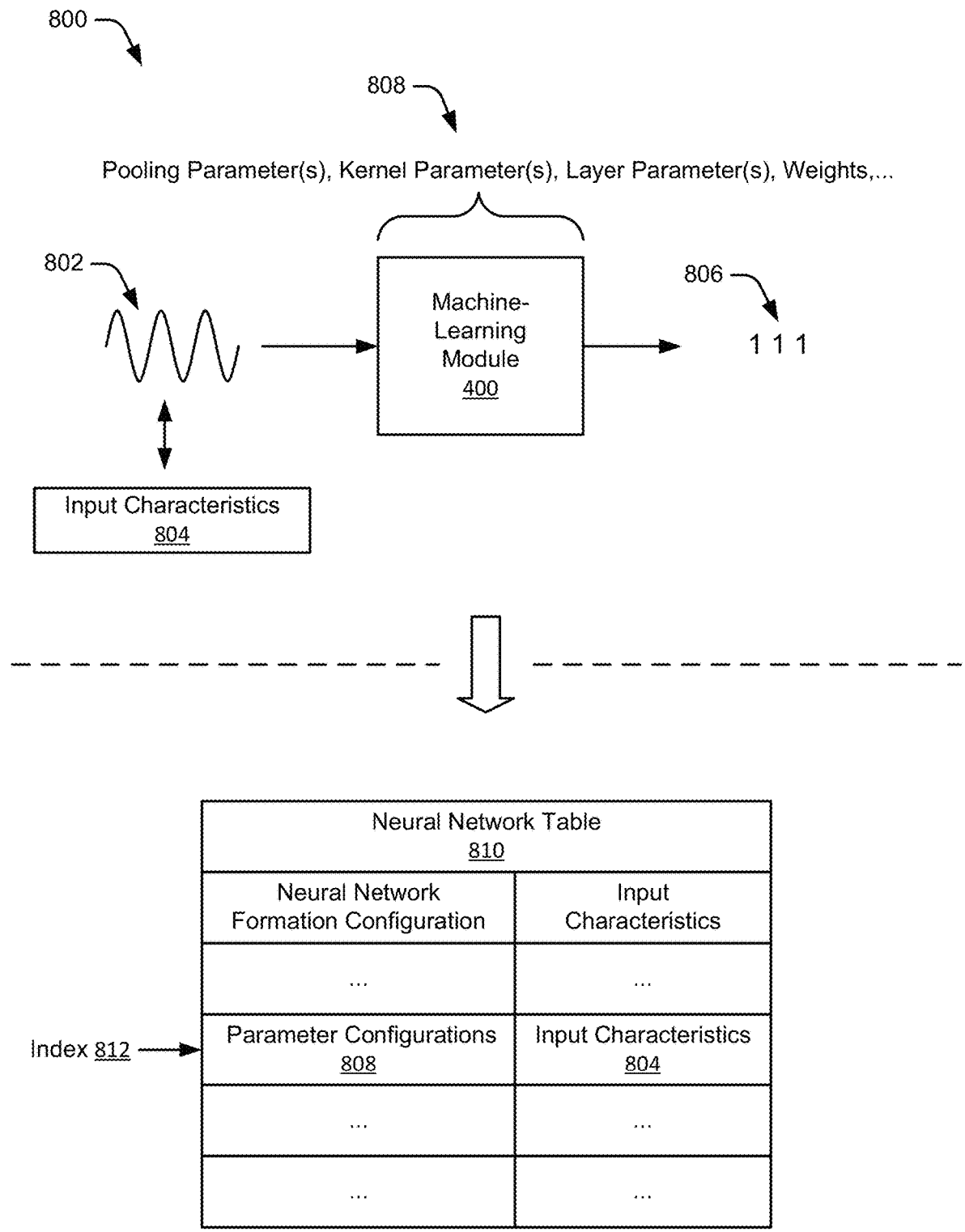
FIG. 8 illustrates an example of generating multiple neural network formation configurations.

In supervised learning, machine-learning modules process labeled training data to generate an output. The machine-learning modules receive feedback on an accuracy of the generated output and modify processing parameters to improve the accuracy of the output. FIG. 8 illustrates an example 800 that describes aspects of generating multiple NN formation configurations. At times, various aspects of the example 800 are implemented by any combination of training module 270, base station neural network manager 268, core network neural network manager 312, and/or training module 314 of FIGS. 2 and 3.

The upper portion of FIG. 8 includes machine-learning module 400 of FIG. 4. In implementations, a neural network manager determines to generate different NN formation configurations. To illustrate, consider a scenario in which the base station neural network manager 268 determines to generate a NN formation configuration by selecting a combination of NN formation configuration elements from a neural network table, where the NN formation configuration corresponds to a UE decoding and/or demodulating downlink communications. In other words, the NN formation configuration (by way of the combination of NN formation configuration elements) forms a DNN that processes downlink communications received by a UE. Oftentimes, however, transmission channel conditions vary which, in turn, affects the characteristics of the downlink communications. For instance, a first transmission channel distorts the downlink communications by introducing frequency offsets, a second transmission channel distorts the downlink communications by introducing Doppler effects, a third transmission channel distorts the downlink communications by introducing multipath channel effects, and so forth. To accurately process the downlink communications (e.g., reduce bit errors), various implementations select multiple NN formation configurations, where each NN formation configuration (and associated combination of NN formation configuration elements) corresponds to a respective input condition, such as a first transmission channel, a second transmission channel, etc.

Training data 802 represents an example input to the machine-learning module 400. In FIG. 8, the training data 802 represents data corresponding to a downlink communication. Training data 802, for instance, can include digital samples of a downlink communications signal, recovered symbols, recovered frame data, etc. In some implementations, the training module generates the training data mathematically or accesses a file that stores the training data. Other times, the training module obtains real-world communications data. Thus, the training module can train the machine-learning module 400 using mathematically generated data, static data, and/or real-world data. Some implementations generate input characteristics 804 that describe various qualities of the training data, such as transmission channel metrics, UE capabilities, UE velocity, and so forth.

Machine-learning module 400 analyzes the training data, and generates an output 806, represented here as binary data. Some implementations iteratively train the machine-learning module 400 using the same set of training data and/or additional training data that has the same input characteristics 804 to improve the accuracy of the machine-learning module 400. During training, the machine-learning module 400 modifies some or all of the architecture and/or parameter configurations of a neural network included in the machine-learning module 400, such as node connections, coefficients, kernel sizes, etc. At some point in the training, the training module determines to extract the architecture and/or parameter configurations 808 of the neural network (e.g., pooling parameter(s), kernel parameter(s), layer parameter(s), weights), such as when the training module determines that the accuracy meets or exceeds a desired threshold, the training process meets or exceeds an iteration number, and so forth. The training module then extracts the architecture and/or parameter configurations from the machine-learning module 400 to use as a NN formation configuration and/or NN formation configuration element(s). The architecture and/or parameter configurations can include any combination of fixed architecture and/or parameter configurations, and/or variable architectures and/or parameter configurations.

The lower portion of FIG. 8 includes neural network table 810 that represents a collection of NN formation configuration elements, such as neural network table 216, neural network table 272, and/or neural network table 316 of FIG. 2 and FIG. 3. The neural network table 810 stores various combinations of architecture configurations, parameter configurations 808, and input characteristics 804, but alternate implementations exclude the input characteristics 804 from the table. Various implementations update and/or maintain the NN formation configuration elements and/or the input characteristics 804 as the machine-learning module 400 learns additional information. For example, at index 812, the neural network manager and/or the training module updates neural network table 810 to include architecture and/or parameter configurations 808 generated by the machine-learning module 400 while analyzing the training data 802.

The neural network manager and/or the training module alternately or additionally adds the input characteristics 804 to the neural network table 810 and links the input characteristics 804 to the architecture and/or parameter configurations 808. This allows the input characteristics 804 to be obtained at a same time as the architecture and/or parameter configurations 808, such as through using an index value that references into the neural network table 810 (e.g., references NN formation configurations, references NN formation configuration elements). In some implementations, the neural network manager selects a NN formation configuration by matching the input characteristics to a current operating environment, such as by matching the input characteristics to current channel conditions, UE capabilities, UE characteristics (e.g., velocity, location, etc.) and so forth.

Having described generating and communicating neural network formation configurations, consider now a discussion of E2E ML for wireless networks that is in accordance with one or more implementations.

E2E ML for Wireless Networks

Aspects of an end-to-end communication (E2E communication) involve two endpoints exchanging information over a communication path, such as through a wireless network. At times, the E2E communication performs a single-directional exchange of information, where a first endpoint sends information and a second endpoint receives the information. Other times, the E2E communication performs bi-directional exchanges of information, where both endpoints send and receive the information. The endpoints of an E2E communication can include any entity capable of consuming and/or generating the information, such as a computing device, an application, a service, and so forth. To illustrate, consider an example in which an application executing at a UE exchanges information with a remote service over a wireless network. For this example, the E2E communication corresponds to the communication path between the application and the remote service, where the application and the remote service act as endpoints.

While the E2E communication involves endpoints that exchange information, the E2E communication alternately or additionally includes intermediate, entities (e.g., devices, applications, services) that participate in the exchange of information. To illustrate, consider again the example of an E2E communication established through a wireless network where an application at a UE functions as a first endpoint and a remote service functions as a second endpoint. In establishing the E2E communication between the endpoints, the wireless network utilizes any combination of UE(s), base station(s), core network server(s), remote network(s), remote service(s), and so forth, such as that described with reference to the environment 100 of FIG. 1. Thus, intermediary entities, such as the base station 120 and the core network 150, participate in establishing the E2E communication and/or participating in the E2E communication to enable an exchange of information between the endpoints.

Different factors impact the operational efficiency of the E2E communication and how the network elements process information exchanged through the E2E communication. For instance, with reference to an E2E communication established using a wireless network, a current operating environment (e.g., current channel conditions, UE location, UE movement, UE capabilities) impacts how accurately (e.g., bit error rate, packet loss) a receiving endpoint recovers the information. As one example, an E2E communication implemented using 5G mmW technologies becomes susceptible to more signal distortions relative to lower frequency sub-6 GHz signals as further described.

As another example, various implementations partition wireless network resources differently based on an end-to-end analysis of an E2E communication, where the wireless network resources include any combination of, by way of example and not of limitation, physical hardware, physical spectrum, logical channels, network functions, services provided, quality of service, latency, and so forth. Wireless network-resource partitioning allows the wireless network to dynamically allocate the wireless network resources based on an expected usage to improve an efficiency of how the wireless network resources are used (e.g., reduce the occurrence of unused and/or wasted resources). To illustrate, consider a variety of devices connecting to a wireless network, where the devices have different performance requirements relative to one another (e.g., a first device has secure data transfer requirements, a second device has high priority/low latency data transfer requirements, a third device has high data rate requirements). For at least some devices, a fixed and/or static distribution of wireless network resources (e.g., a fixed configuration for the wireless network resources used to implement an E2E communication) can lead to unused resources and/or fail to meet the performance requirements of some services. Thus, partitioning the wireless network resources can improve an overall efficiency of how the wireless network resources are utilized. However, the partitioning causes variations in how one pair of E2E endpoints exchanges information relative to a second pair of E2E endpoints.

A Quality-of-Service flow (QoS flow) corresponds to information exchanged in a wireless network. At times, an E2E communication includes and/or corresponds to a QoS flow. Some wireless networks configure a QoS flow with operating rules, priority levels, classifications, and so forth, that influence how information is exchanged through the QoS flow. For example, a QoS profile indicates to a wireless network the QoS parameters and/or QoS characteristics of a particular QoS flow, such as a Guaranteed Flow Bit Rate (GFBR) parameter used to indicate an uplink and/or downlink guaranteed bit rate for the QoS flow, a Maximum Flow Bit Rate (MFBR) parameters used to indicate a maximum uplink and/or downlink bit rate for the QoS flow, an Allocation and Retention Priority (ARP) parameter that indicates a priority level, a pre-emption capability, and/or pre-emption vulnerability of the QoS flow, a Reflective QoS attribute (RQA) that indicates a type of traffic carried on the QoS flow is subject to Reflective QoS (e.g., implicit updates), a Notification Control parameter that indicates whether notifications are requested when a guaranteed flow bit rate cannot be guaranteed, or resumes, for the QoS flow, an aggregate bit rate parameter that indicates an expected aggregate bit rate for the collective non-guaranteed-bit-rate (Non-GBR) flows associated with a particular UE, default parameters for 5QI and ARP priority levels, a Maximum Packet Loss Rate (MPLR) for uplink and/or downlink that indicates a maximum rate for lost packets of the QoS flow, a Resource Type characteristic that indicates types of resources that can be used by the QoS flow (e.g., GBR resource type, Delay-critical GBR resource type, non-GBR resource type), a scheduling priority level characteristic that distinguishes between multiple QoS flows of a same UE, a Packet Delay Budget characteristic that provides an upper bound to how long a packet may be delayed, a Packet Error Rate characteristic that indicates an upper bound for a rate of PDUs unsuccessfully received, an Averaging Window characteristics that indicates a window of data over which to calculate the GFBR and/or MFBR, a Maximum Data Burst Volume characteristic that indicates a largest amount of data that is required to be served over a pre-defined time period, and so forth. In some implementations, the parameters and/or characteristics that specify the configuration of a QoS flow can be pre-configured (e.g., default) and/or dynamically communicated, such as through the QoS profile. These variations impact how the wireless network partitions the various wireless network resources to support the QoS flow configuration.

For example, a UE can include three applications, where each application has a different performance requirement (e.g., resource type, priority level, packet delay budget, packet error rate, maximum data burst volume, averaging window, security level). These different performance requirements cause the wireless network to partition the wireless network resources assigned to the respective QoS flows assigned to each application differently from one another.

To demonstrate, consider a scenario in which the UE includes a gaming application, an augmented reality application, and a social media application. In some instances, the gaming application interacts with a remote service (through the data network) to connect with another gaming application to exchange audio in real-time, video in real-time, commands, views, and so forth, such that the gaming application has performance requirements with high data volume and low latency. The augmented reality application also interacts with a remote service through the data network to transmit location information and subsequently receive image data that overlays on top of a camera image generated at the UE. Relative to the gaming application, the augmented reality application utilizes less data, but has some time-sensitivity to maintain synchronization between a current location and a corresponding image overlay. Finally, the social media application interacts with a remote service through the data network to receive feed information, where the feed information has less data volume and time-criticality relative to data consumed by the augmented reality application and/or the gaming application.

Based upon these performance requirements, the wireless network establishes QoS flows between the applications and a data network, where the wireless network constructs each QoS flow based on QoS requirements, QoS parameters and/or QoS characteristics (e.g., resource type, priority level, packet delay budget, packet error rate, maximum data burst volume, averaging window, security level) that indicate a high data volume performance requirement and a time-sensitivity performance requirement. In implementations, the QoS requirements, the QoS parameters and/or the QoS characteristics included in a QoS profile correspond to the performance requirements of the QoS flow. As one example, the wireless network processes a QoS profile associated with a first QoS flow that configures any combination of a GFBR parameter, a Maximum Data Burst Volume characteristic, an ARP parameter, and so forth. The wireless network then constructs the QoS flow by partitioning the wireless network resources based on the QoS parameters and/or characteristics.

While the configurability of the QoS flows provide flexibility to the wireless network to dynamically modify how the wireless network resources are allocated, the configurability adds complexity in how the wireless network processes information that is exchanged between the endpoints. Some implementations train DNNs to perform some or all of the complex processing associated with exchanging information using E2E communications with various configurations. By training a DNN on the differing processing chain operations and/or wireless network resource partitioning, the DNN can replace the conventional complex functionality as further described. The usage of DNNs in an E2E communication also allows a network entity to adapt the DNN to changing operating conditions, such as by modifying various parameter configurations (e.g., coefficients, layer connections, kernel sizes).

One or more implementations determine an E2E ML configuration for processing information exchanged through an E2E communication. In some cases, an end-to-end machine-learning controller (E2E ML controller) obtains capabilities of device(s) associated with end-to-end communications in a wireless network, such as machine-learning (ML) capabilities of device(s) participating in the E2E communication, and determines an E2E ML configuration based on the ML capabilities (e.g., supported ML architectures, supported number of layers, available processing power, memory limitation, available power budget, fixed-point processing vs. floating point processing, maximum kernel size capability, computation capability) of the device(s). Alternately or additionally, the E2E ML controller identifies a current operating environment and determines the E2E ML configuration based on the current operating environment. Some implementations of the E2E ML controller communicate with a network-slice manager to determine an E2E ML configuration that corresponds to a network slice (e.g., a partitioning of wireless network resources). In determining the E2E ML configuration, some implementations of the E2E ML controller partition the E2E ML configuration based on the device(s) participating in the E2E communication and communicate a respective partition of the E2E ML configuration to each respective device.

Figure 9:
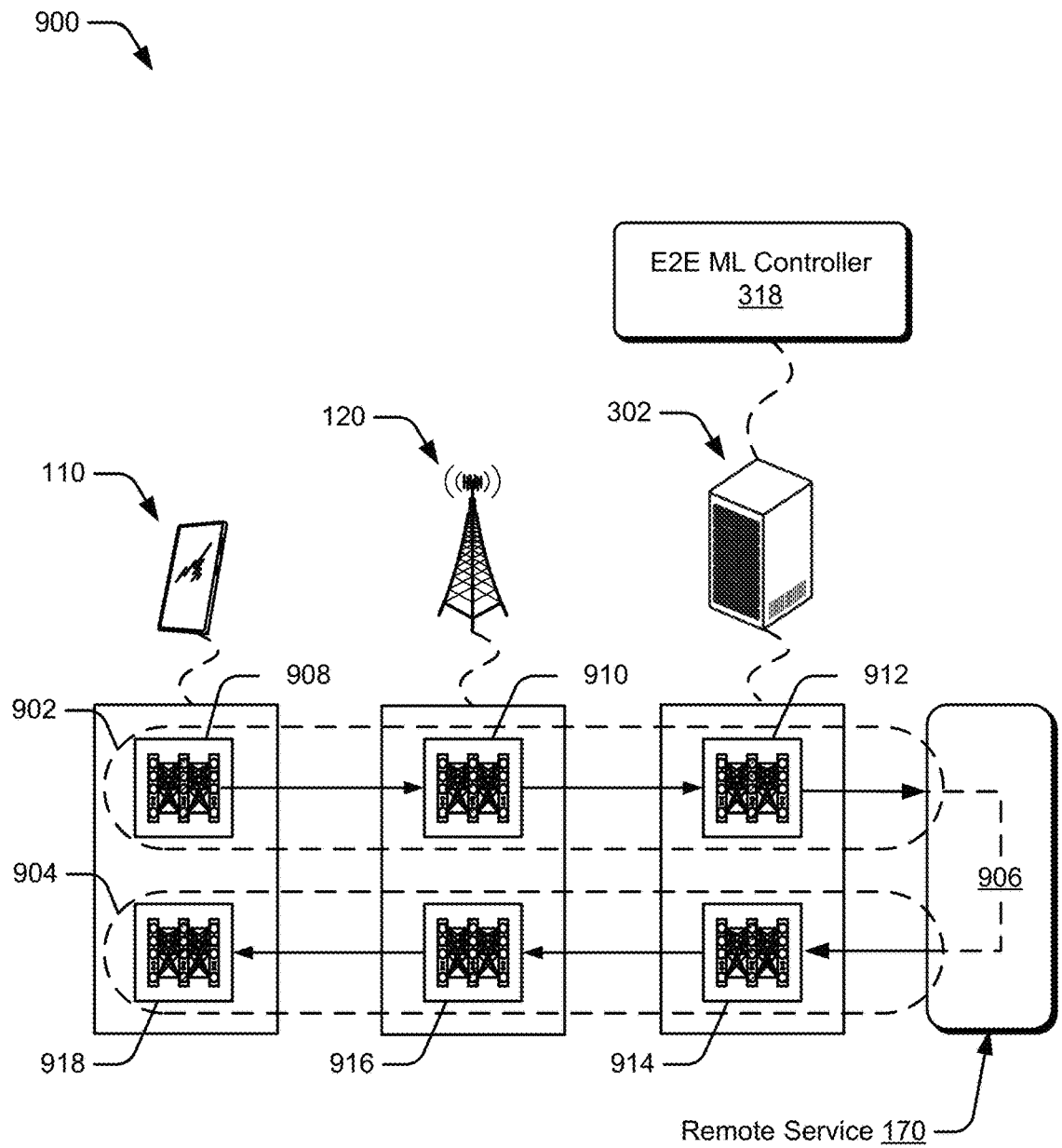
FIG. 9 illustrates an example environment in which various aspects of machine-learning architectures for simultaneous connection to multiple carriers can be implemented.

To demonstrate, consider FIG. 9 that illustrates an example environment 900 in which example E2E ML configurations for E2E communications include DNNs operating at multiple devices. In implementations, the example environment 900 illustrates aspects of machine-learning architectures for broadcast and multicast communications. The environment 900 includes the UE 110, the base station 120, and the remote service 170 of FIG. 1, and the core network server 302 of FIG. 3. In implementations, the UE 110 and the remote service 170 exchange information with one another using E2E communication 902 and E2E communication 904. For clarity, the E2E communications 902 and 904 are illustrated as being separate and single-directional E2E communications such that the exchange of information over each communication E2E corresponds to one direction (e.g., E2E communication 902 includes uplink transmissions, E2E communication 904 includes downlink transmissions), but in alternate or additional implementations, the E2E communication 902 and the E2E communication 904 correspond to a single, bi-directional E2E communication that includes both, signified in the environment 900 with a dashed line 906. In implementations, the E2E communication 902 and the E2E communication 904 (in combination) correspond to a single QoS flow.

The environment 900 also includes the E2E ML controller 318 that is implemented by the core network server 302, where the E2E ML controller 318 determines an E2E ML configuration for the E2E communication 902 and/or the E2E communication 904. In some implementations, the E2E ML controller determines a first E2E ML configuration for the E2E communication 902 and a second E2E ML configuration for the E2E communication 904, such as when each E2E communication corresponds to single-directional information exchanges. In other implementations, the E2E ML controller determines an E2E ML configuration for a bi-directional E2E communication that includes both E2E communications 902 and 904. For example, in response to the UE 110 requesting a connection to the remote server 170, such as through the invocation of an application, the E2E ML controller determines an E2E ML configuration for a corresponding connection based on any combination of ML capabilities of the UE 110 (e.g., supported ML architectures, supported number of layers, processing power available for ML processing, memory constraints applied to ML processing, power budget available for ML processing, fixed-point processing vs. floating point processing), performance requirements associated with the requested connection (e.g., resource type, priority level, packet delay budget, packet error rate, maximum data burst volume, averaging window, security level), available wireless network resources, ML capabilities of intermediary devices (e.g., the base station 120, the core network server 302), a current operating environment (e.g., channel conditions, UE location), and so forth. As one example, the E2E ML controller 318, by way of the core network server 302, receives base station metrics and/or UE metrics that describe the current operating environment. As another example, the E2E ML controller, by way of the core network server 302, receives base station ML capabilities and/or UE capabilities. Alternately or additionally, the E2E ML controller communicates with the network-slice manager 320 to identify a network slice that partitions the wireless network resources in a manner that supports QoS requirement(s).

In one or more implementations, the E2E ML controller 318 analyzes a neural network table based upon any combination of the device capabilities, the wireless network resource partitioning, the operating parameters, the current operating environment, the ML capabilities, and so forth, to determine the E2E ML configuration. While described as being implemented by the core network server 302, in alternate or additional implementations, the E2E ML controller 318 may be implemented by another network entity, such as the base station 120.

To illustrate, and with reference to FIG. 8, the training module 270 and/or the training module 314 train the machine-learning module 400 with variations of the training data 802 that reflect different combinations of the capabilities, wireless network resource partitioning, the operating parameters, the current operating environment, and so forth. The training module extracts and stores the architecture and/or parameter configurations (e.g., architecture and/or parameter configurations 808) in a neural network table such that, at a later point in time, the E2E ML controller 318 accesses the neural network table to obtain and/or identify neural network formation configurations that correspond to a determined E2E ML configuration. The E2E ML controller 318 then communicates the neural network formation configurations to various devices and directs the respective device to form a respective DNN as further described.

In determining the E2E ML configuration, the E2E ML controller 318 sometimes partitions the E2E ML configuration based on devices participating in the corresponding E2E communication. For example, the E2E ML controller 318 determines a first partition of the E2E ML configuration that corresponds to processing information at the UE 110, a second partition of the E2E ML configuration that corresponds to processing information at the base station 120, and a third partition of the E2E ML configuration that corresponds to processing information at the core network server 302, where determining the partitions can be based on any combination of the capabilities, wireless network resource partitioning, the operating parameters, the current operating environment, and so forth.

As one example, consider an E2E communication that corresponds to voice transmissions over a wireless network, such as the E2E communication 902, the E2E communication 904, and/or a combination of both E2E communications. In determining an E2E ML configuration for the E2E communication, the E2E ML controller 318 alternately or additionally identifies that performance requirement(s) of the E2E communication indicates large volumes of data transfer with low latency requirements. When given performance requirement(s), the E2E ML controller identifies an E2E ML configuration that, when formed by the respective DNN(s), performs end-to-end functionality that exchanges voice communications and satisfies the performance requirement(s). To illustrate, the E2E ML controller determines an E2E ML configuration that performs end-to-end functionality for transmitting voice from a UE to a core network server, such as signal processing, voice encoding, channel encoding, and/or channel modulation at the UE side, channel decoding, demodulation, and/or signal processing at the base station side, decoding voice at the core network server side, and so forth, and selects a configuration designed to satisfy the performance requirements.

Some implementations partition an E2E ML configuration based the ML capabilities of devices participating in the E2E communication and/or the performance requirements. A UE, for instance, may have less processing resources (e.g., processing capabilities, memory constraints, quantization constraints, fixed-point vs. floating point computations, FLOPS, power availability relative to a base station and/or a core network server, which can be indicated through the ML capabilities. In response to identifying the different processing resources through an analysis of the ML capabilities, the E2E ML controller partitions the E2E ML configuration such that a first partition (e.g., at the UE 110) forms a DNN that performs less processing than a DNN formed by a second or third partition (e.g., at the base station, at the core network server). Alternately or additionally, the E2E ML controller partitions the E2E ML configuration to produce neural networks designed to not exceed device capabilities. For example, when provided with UE capabilities, the E2E ML controller directs the UE to form a DNN with less layers and a smaller kernel size relative to a DNN formed by the base station and/or the core network server based on processing constraints of the UE. Alternately or additionally, the E2E ML controller partitions the E2E ML configuration to form, at the UE) a neural network with an architecture (e.g., a convolutional neural network, a long short-term memory (LSTM) network, partially connected, fully connected) that processes information without exceeding memory constraints of the UE. In some instances, the E2E ML controller calculates whether an amount of computation performed at each device collectively meets a performance requirement corresponding to a latency budget and determines an E2E ML configuration designed to meet the performance requirement.

In the environment 900, the E2E ML controller 318 determines a first E2E ML configuration for processing information exchanged through the E2E communication 902 and determines to partition the first E2E ML configuration across multiple devices such as by partitioning the first E2E ML configuration across the UE 110, the base station 120, and the core network server 302 based on device capabilities. In other words, some implementations determine an E2E ML configuration that corresponds to a distributed DNN in which multiple devices implement and/or form portions of the DNN. To communicate the partitioning, the E2E ML controller 318 identifies a first neural network formation configuration (NN formation configuration) that corresponds to a first partition of the E2E ML configuration and communicates, by using the core network server 302, the first NN formation configuration to the UE 110. The E2E ML controller 318 and/or the core network server 302 then directs the UE to form a user equipment-side deep neural network 908 (UE-side DNN 908) for processing information exchanged through the E2E communication 902. Similarly, the E2E ML controller 318 identifies a second NN formation configuration that corresponds to a second partition of the E2E ML configuration and communicates the second NN formation configuration to the base station 120. The E2E ML controller 318 and/or the core network server 302 then directs the base station 120 to form, using the second NN formation configuration, a base station-side deep neural network 910 (B S-side DNN 910) for processing information exchanged through the E2E communication 902. The E2E ML controller 318 also identifies and communicates a third NN formation configuration to the core network server 302 to use in forming a core network server-side deep neural network 912 (CNS-side DNN 912) for processing information exchanged through the E2E communication 902.

In implementations, the E2E ML controller 318 partitions the E2E ML configuration to distribute processing computations performed over the E2E communication such that the UE-side DNN 908 performs less processing relative to the BS-side DNN 910 (e.g., a UE-side DNN 908 that uses less layers, less data processing points, and so forth, relative to the BS-side DNN 910). Alternately or additionally, the E2E ML controller 318 partitions the E2E ML configuration such that the B S-side DNN 910 performs less processing relative to CNS-side DNN 912. In combination, the processing performed by the UE-side DNN 908, the BS-side DNN 910, and the CNS-side DNN 912 exchange information across the E2E communication 902.

In a similar manner, the E2E ML controller 318 determines a second E2E ML configuration for processing information exchanged through the E2E communication 904, where the E2E ML controller partitions and/or distributes the second E2E ML configuration across multiple devices. In the environment 900, this partitioning corresponds to a core network server-side deep neural network 914 (CNS-side DNN 914), a base station-side deep neural network 916 (BS-side DNN 916), and a user equipment-side deep neural network 918 (UE-side DNN 918). In combination, the processing performed by the CNS-side DNN 914, the B S-side DNN 916, and the UE-side DNN 918 corresponds to exchanging information using the E2E communication 904. While the E2E ML controller determines the first and second E2E ML configurations separately in the environment 900 for single-directional E2E communications (e.g., the E2E communications 902 and 904), in alternate or additional implementations, the E2E ML controller 318 determines a single E2E ML configuration that corresponds to exchanging bi-directional information using an E2E communication. Accordingly, with respect to the E2E communication 902 and/or the E2E communication 904, the E2E ML controller 318 determines a partitioned E2E ML configuration and communicates respective portions of the partitioned E2E ML configuration to the devices participating in the E2E communication 902 and/or the E2E communication 904.

In implementations, the E2E ML controller 318 periodically reassess metrics, performance requirements, wireless link performance, processing capabilities of devices or other aspects affecting, or providing an indication of, a current operating environment and/or a current performance (e.g., bit errors, BLER) to determine whether to update the E2E ML configuration. For example, the E2E ML controller 318 determines modifications (e.g., parameter changes) to an existing DNN to better accommodate the performance requirements of devices, applications, and/or transmissions in a wireless network. A UE changing location may impact on the wireless link performance, or a user opening an application at the UE may reduce the processing capability the user equipment can provide for machine learning. By reassessing dynamically changing conditions (e.g., changes in the operating environment, changes in the devices), the E2E ML controller can modify or update the E2E ML configuration to improve an overall efficiency of how the wireless network resources are utilized.

Having described E2E ML for wireless networks, consider now a discussion of machine-learning architectures for machine-learning architectures for simultaneous connection to multiple carriers that are in accordance with one or more implementations.

Machine-Learning Architectures for Simultaneous Connection to Multiple Component Carriers In various implementations, a wireless communication system uses multiple component carriers to propagate information between devices. As one example, a base station transmits data to a receiving UE over multiple component carriers (simultaneously) as a way to increase the throughput of data between the base station and UE. As another example, a UE establishes a first connection to a first base station with a first component carrier, and a second connection to a second base station with a second component carrier to increase data throughput. While exchanging information over multiple component carriers increases data throughput between devices, the use of multiple component carriers also increases the complexity of the communications. A first UE receiving information over multiple component carriers, for instance, manages the information with more complex synchronization operations relative to a second UE receiving information over a single component carrier. Synchronization at the base station also increases in complexity, such as when the base station manages the multiple component carriers or synchronizes the communications with a second base station.

Figure 10:
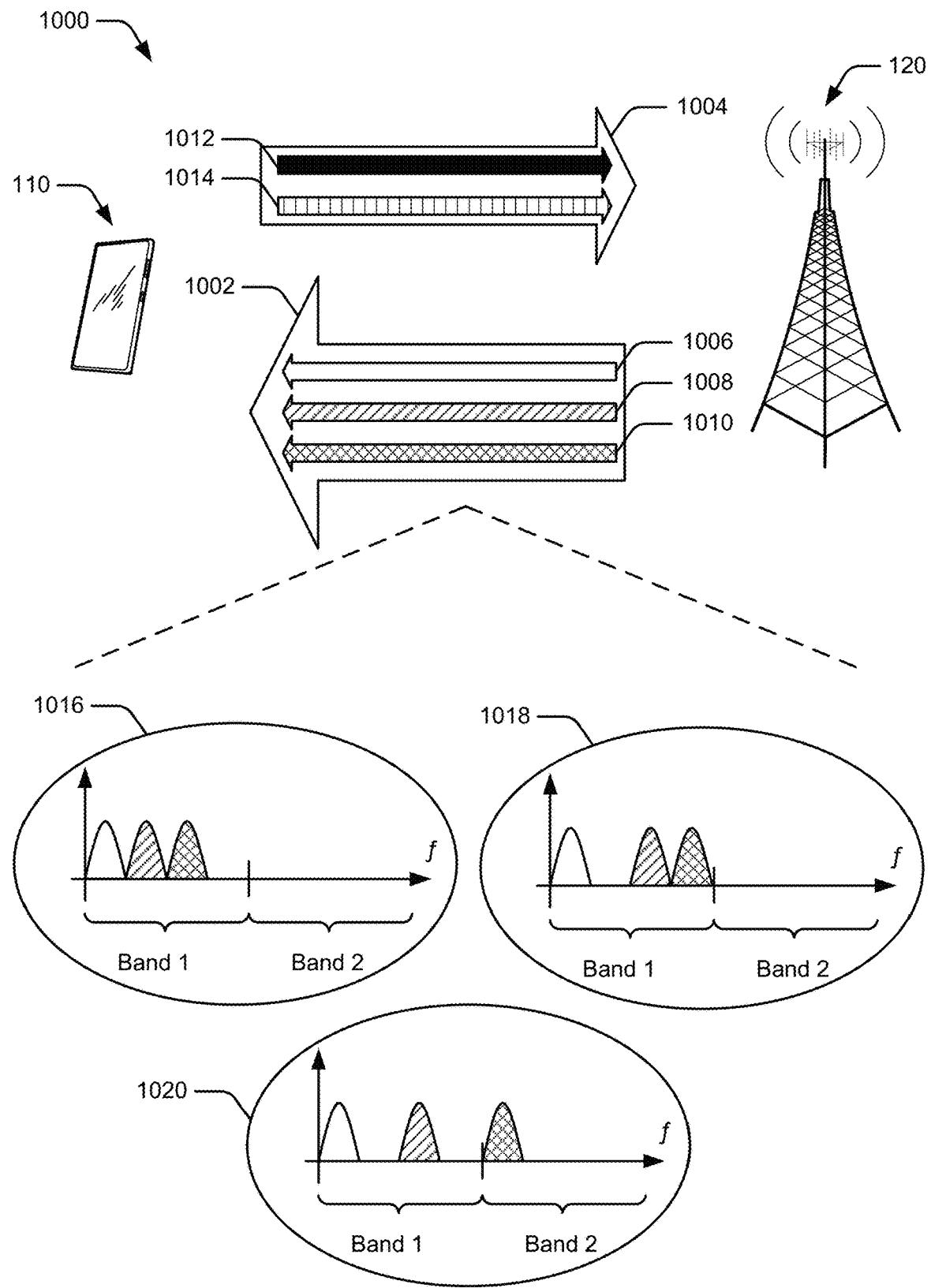
FIG. 10 illustrates an example environment in which various aspects of machine-learning architectures for simultaneous connection to multiple carriers can be implemented.

FIG. 10 illustrates an example environment 1000 that can utilize machine-learning architectures for simultaneous connection to multiple carriers in accordance with one or more implementations, such as carrier aggregation, dual connectivity, or other split architecture communications. The environment 1000 includes the base station 120 and UE 110 of FIG. 1, where the base station 120 and the UE 110 exchange information using carrier aggregation by way of downlink communications 1002 and uplink communications 1004. Downlink communications 1002 transmit information to the UE 110 using three component carriers: component carrier 1006, component carrier 1008, and component carrier 1010. Similarly, uplink communications 1004 transmit information to the base station 120 using two component carriers: component carrier 1012 and component 1014. For clarity, each component carrier illustrated in the environment 1000 corresponds to a single-directional communication link (e.g., downlink only, uplink only). However, in alternate or additional implementations, a component carrier corresponds to a bi-directional communication link, such as a communication link that includes a downlink component and an uplink component. Further, while the environment 1000 illustrates the base station and the UE each using carrier aggregation, other implementations can include one-way carrier aggregation that corresponds using carrier aggregation in a single direction for the information transfer (e.g., only downlink carrier aggregation, only uplink carrier aggregation).

Carrier aggregation (CA) adds more bandwidth to a communication link between devices by transferring information using multiple component carriers. The base station 120, for instance, increases a number of aggregated component carriers to increase an amount of information exchanged. At a given instance in time, a receiving device (e.g., UE 110) obtains the information from the multiple component carriers in a more-timely fashion relative to obtaining the information using a single component carrier. In CA, a protocol stack at the base station 120 manages aspects of the component carrier 1006, the component carrier 1008, and the component carrier 1010, such as which component carrier carries what information. The protocol stack at the base station 120, as one example, manages splitting user traffic amongst the component carrier 1006, the component carrier 1008, and the component carrier 1010. Further, in CA, the (aggregated) component carriers use a common cell-radio network temporary identifier (C-RNTI) between one another.

Image 1016, image 1018, and image 1020 illustrate three example configurations that can be utilized for CA. Image 1016 depicts a contiguous, intra-band configuration of the component carrier 1006, the component carrier 1008, and the component carrier 1010 in the frequency domain, where each component carriers used in the CA resides in a same band. The contiguous placement of each component carrier simplifies the transmissions but can be difficult to obtain based on other active communications residing in the contiguous spectrum. Image 1018 depicts a non-contiguous, intra-band configuration, where at least one component carrier used in the carrier-aggregation-communications resides in the same band as the other component carriers, but at a non-contiguous location. This allows a device selecting the component carriers, such as the base station 120, to use the wireless network resources more efficiently by selecting unused component carriers for the carrier aggregations. Image 1020 depicts a non-contiguous, inter-band configuration, where at least one component carrier used in the carrier-aggregation-communications resides in a different frequency band. For example, in various implementations, band 1 of image 1020 corresponds to licensed bands allocated to the base station 120 and band 2 of image 1020 corresponds to unlicensed bands used by the base station 120, such as frequency bands accessed through Licensed-Assisted Access (LAA). As another example, band 1 of image 1020 can correspond to 5G mmW communications, and band 2 of image 1020 can correspond to narrow-band cellular IoT communications (e.g., different communication types with different bandwidths). For clarity, FIG. 10 illustrates a split with two bands, but alternate implementations can utilize more bands and/or component carriers.

In implementations and with reference to FIG. 8, a training module (e.g., training module 270, training module 314) trains a machine-learning module to process carrier-aggregation-communications using variations of these configurations, such as different bands, different combinations of component carriers, licensed access versus unlicensed access, varying bandwidths, varying protocols, etc. This includes training the machine-learning module on different component carriers. For instance, consider the neural network table 812 of FIG. 8. The index value 814 maps to the architecture and/or parameter configurations 808 that form a DNN based on processing in an operating environment, signal characteristics, and so forth, that correspond to the input characteristics 804. Some implementations generate, for various component carriers, versions of the architecture and/or parameter configurations 808 for the input characteristics 804. In other words, the training module generates a first grouping of architecture and/or parameter configurations based on the input characteristics 804 for a first component carrier, a second grouping of architecture and/or parameter configurations based on the input characteristics 804 for a second component carrier, and so forth.

Various implementations use a component-carrier-index-value to reference the architecture and/or parameter configurations. To illustrate, and with reference to the neural network table 812, the addition of component-carrier-index-values would add depth or layers (e.g., another dimension) to the neural network table. A first component-carrier-index-value (corresponding to a first component carrier) maps, for example, to a first instance or layer of the neural network table. Similarly, a second component-carrier-index-value (corresponding to a second component carrier) maps to a second instance or layer of the neural network table, and so forth.

Figure 11:
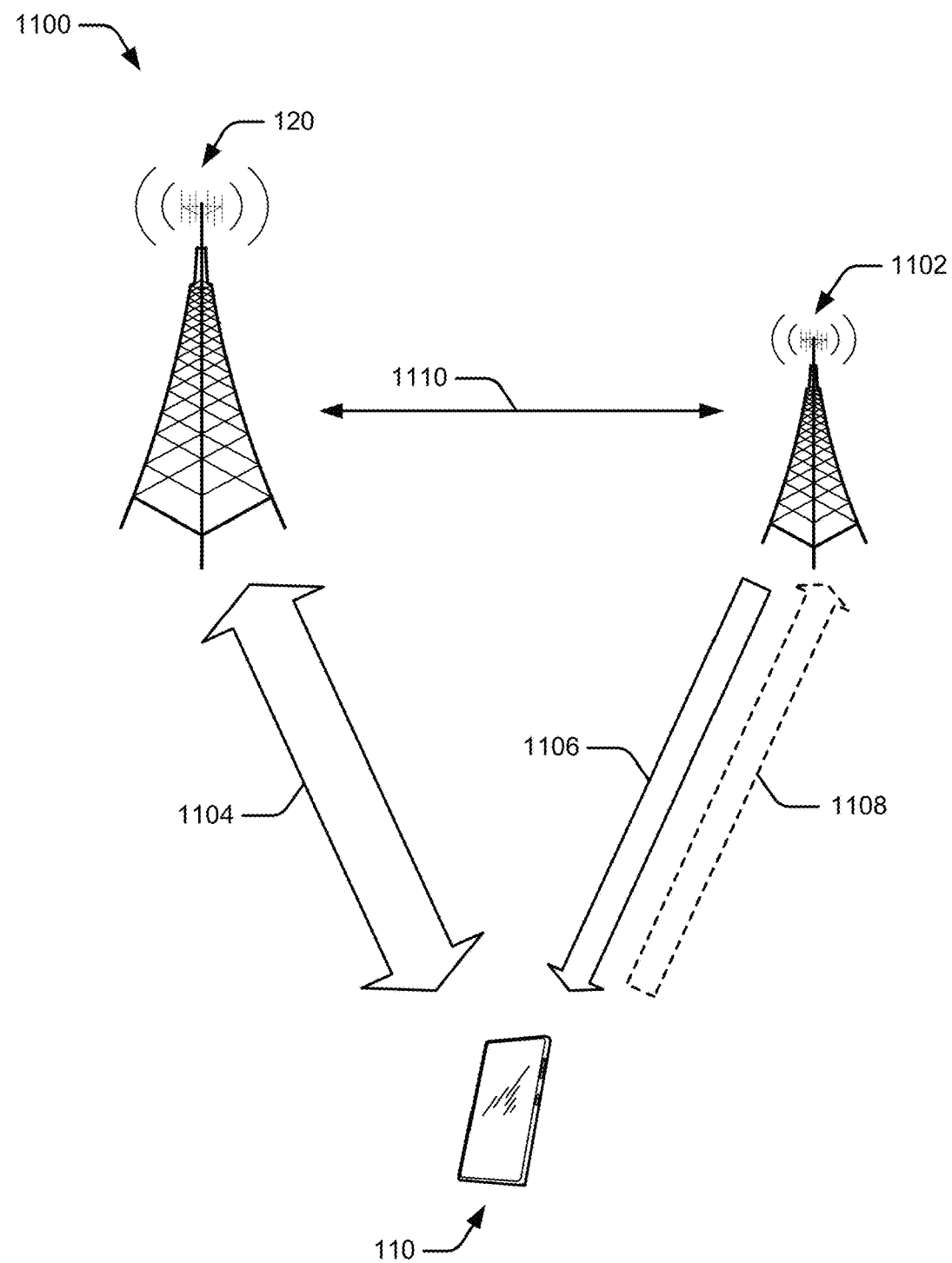
FIG. 11 illustrates an example environment in which various aspects of machine-learning architectures for simultaneous connection to multiple carriers can be implemented.

FIG. 11 illustrates an example environment 1100 that utilizes machine-learning architectures for simultaneous connection to multiple carriers in accordance with one or more implementations, such as carrier aggregation, dual connectivity, or other split architecture communications. The environment 1100 includes the base station 120 and UE 110 of FIG. 1, and a second base station 1102. In some implementations, the base station 120 acts as a master managing the communications, and the base station 1102 acts as a secondary to the master that receives instructions from the master.

In the environment 1100, the UE 110 maintains dual connectivity (DC) with the base station 120 and the base station 1102. To illustrate, the UE 110 uses at least a first component carrier to establish communication link 1104 with the base station 120. In this example, the communication link 1104 illustrates a bi-directional communication link that includes downlink communications and uplink communications between the UE 110 and the base station 120, but in other implementations, the UE 110/base station 120 establish the communication link 1104 as a single-directional link. At times, the communication link 1104 includes multiple component carriers, such as those described with reference to downlink communications 1002 and/or uplink communications 1004 of FIG. 10.

The UE 110 also uses at least a second component carrier to establish communication link 1106 with the base station 1102. The environment 1100 illustrates the communication link 1106 in the form of (single-directional) downlink communications. Optionally, the communication link 1106 can alternately or additionally include uplink communication capabilities, illustrated here as communication link 1108. Thus, the communication link 1106 and the communication link 1108 can, collectively, correspond to a component carrier with bi-directional communication capabilities.

To main synchronicity between the different connections, the base station 120 communicates with the base station 1102 using link 1110. For instance, in some implementations, link 1110 corresponds to an X2 interface or an Xn interface. This allows the master (e.g., the base station 120) to synchronize the information being exchanged through the different communication links.

In some implementations, the base station 120 communicates instructions, commands, and/or information to the UE 110 over the communication link 1104, where the instructions, commands, and/or information pertain to the communication link 1106 and/or the communication link 1108. Contrary to CA, the communication link 1104 and the communication link 1106 (with or without the optional communication link 1108) utilized for DC have different C-RNTI values from one another. Thus, the communication link 1104 has a first C-RNTI, and the communication link 1106 has a second C-RNTI.

Similar to CA, DC can include multiple variations. In some implementations, the communication link 1104 and the communication link 1106 (and/or the communication link 1108) correspond to connections made using a same Radio Access Technology (RAT), thus making the DC illustrated in the environment 1100 intra-RAT DC. Other times, the communication link 1104 and the communication link 1106 (and/or the communication link 1108) correspond to connections made using different RATs, thus making the DC illustrated in the environment 1100 inter-RAT DC. As another variation, DC sometimes includes carrier aggregation. To illustrate, the communication link 1104, the communication link 1106, and/or the optional communication link 1108 can include multiple component carriers (e.g., downlink communications 1002, uplink communications 1004). In implementations and with reference to FIG. 8, a training module (e.g., training module 270, training module 314) trains a machine-learning module to process DC using variations of these configurations (e.g., different component carriers, Inter-RAT DC, Intra-RAT DC, the inclusion of CA, the exclusion of CA).

In aspects of machine-learning architectures for simultaneous connection to multiple carriers, a network entity determines a deep neural network (DNN) configuration for processing information exchanged with a user equipment (UE) over the wireless communication system using carrier aggregation. To illustrate, consider now FIG. 12 that illustrates an example environment 1200 that can utilize machine-learning architectures for simultaneous connection to multiple carriers, in accordance with one or more implementations, such as carrier aggregation, dual connectivity, or other split architecture communications. In this example, the communications employ downlink carrier aggregation. The environment 1200 includes the base station 120 and the UE 110 of FIG. 1. At times, the environment 1200 optionally includes the core network server 302 of FIG. 3.

The base station 120 includes one or more DNN(s) 1202 that process information exchanged over a wireless communication system using carrier aggregation. Alternately or additionally, the DNNs 1202 process other types of multiple component carrier communications and/or split architectures, such as Coordinated Multi Point (CoMP) communications, DC communications, Central Unit-Distributed Unit (CU-DU) architectures, or Multi-RAT Dual Connectivity (MR-DC). Similarly, UE 110 includes one or more DNN(s) 1204 that perform complementary operations relative to DNNs 1202. Optionally, the core network server 302 includes one or more DNN(s) 1206, such as in scenarios that employ E2E ML configurations as described with reference to FIG. 14.

DNNs 1202 perform operations associated with communicating information using carrier aggregation, other multiple component carrier communications, and/or split architecture communications. To illustrate, in various implementations, the DNNs 1202 include, or perform equivalent operations corresponding to, a first sub-DNN 1208 that generates a split output, a second sub-DNN 1210 that receives and processes a first output of the split output, and a third sub-DNN 1212 that receives and processes a second output of the split output. Alternately or additionally, the DNNs 1202 perform transmitter processing chain operations, such as those described with reference to FIG. 6. At times, the DNNs 1202 include the sub-DNN 1208, sub-DNN 1210, and sub-DNN 1212 as distinct and separate DNNs formed for performing specific processing operations (e.g., generating a split output, generating a first component carrier, generating a second component carrier). Other times, the DNNs 1202 are implement as a single DNN that performs the operations of the sub-DNN 1208, sub-DNN 1210, and sub-DNN 1212, or as a DNN formed from a portion of a distributed E2E ML configuration as further described.

In some implementations, the component carriers have different characteristics that affect the operations performed by each sub-DNN. To illustrate, consider an example in which the first component carrier resides in a licensed band and the second component carrier resides in an unlicensed band. Since the bands use different protocol and/or communication mechanisms, the sub-DNNs (or portions of a single DNN) that process the respective component carriers perform different operations from one another. The sub-DNN processing the second component carrier in the unlicensed band, for example, performs processing operations that perform listen-before-talk (LBT) and/or a clear channel assessment (CCA), while the sub-DNN processing the first component carrier in the licensed band performs processing operations that correspond to the communication mechanisms of the licensed band. As another example, the component carriers can reside in different frequency spectrums that correspond to different signaling mechanisms. A sub-DNN processing a first component carrier with mmW properties may include beamforming/tracking operations, while a sub-DNN processing a second component carrier with longer wavelengths relative to mmW may exclude the beamforming/tracking operations. Thus, the sub-DNNs included in the DNNs 1202 (and/or the DNNs 1204) can be configured to perform different operations from one another based on various characteristics of the component carriers being processed. In implementations, a training module (e.g., training module 270, training module 314) jointly trains the machine-learning module 400 to process multiple component carriers with different processing operations (e.g., beamforming, excluding beamforming, LBT, excluding LBT). Sometimes, this training can result in different architectures for the respective sub-DNNs.

In some implementations, the sub-DNNs of DNNs 1202 are interchangeable and/or modularized from one another. To illustrate, consider an example in which the base station 120 exchanges information with the UE 110 using a single component carrier. In such a scenario, the DNNs 1202 include, or perform functionality equivalent to, sub-DNN 1208 and sub-DNN 1210 to generate and transmit information using a first component carrier 1214. At a later arbitrary point in time, the base station determines to exchange information using carrier aggregation or other forms of multiple component carrier communications. The base station determines, by way of any combination of the base station neural network manager 268, the core network neural network manager 312, an E2E ML controller, and/or a network-slice manager, a DNN configuration corresponding to the sub-DNN 1212 and/or updates to sub-DNN 1208. The determined DNN configuration adds processing to the DNNs 1202 that generates and transmits information using a second component carrier 1216. The base station 120 then forms and adds the sub-DNN 1212 to the DNNs 1202. Alternately or additionally, the base station 120 updates the DNN 1208 to generate a split output as further described. As another example, the base station 120 removes a sub-DNN from the DNNs 1202 (e.g., sub-DNN 1210, sub-DNN 1212) in response to terminating the second component carrier of the carrier-aggregation-communications, or changing component carriers.

Similar to the DNNs 1202, the DNNs 1204 perform operations associated with communicating information using carrier aggregation, other multiple component carrier communications, and/or split architecture communications. In implementations, the DNNs 1204 perform complementary processing to the DNNs 1202 as described with respect to FIG. 6. At times, the DNNs 1204 include, or perform equivalent operations corresponding to, a first sub-DNN 1218 that receives and processes a first component carrier (e.g., the component carrier 1214), a second sub-DNN 1220 that receives and processes a second component carrier (e.g., the component carrier 1216), and a third sub-DNN 1222 that receives multiple inputs, and aggregates the information from the multiple inputs. Alternately or additionally, the DNNs 1204 perform receiver processing chain operations. At times, the UE 110 forms the sub-DNN 1218, sub-DNN 1220, and sub-DNN 1222 as distinct and separate (inter-changeable/modularized) DNNs for performing specific processing operations (e.g., receiving and processing a first component carrier, receiving and processing a second component carrier, aggregating multiple inputs). Other times, the UE 110 forms the DNNs 1204 as a single DNN that performs processing equivalent to that described for the sub-DNN 1218, the sub-DNN 1220, and the sub-DNN 1222, or a DNN formed from a portion of a distributed E2E ML configuration as further described.

Optionally, the DNNs 1206 of the core network server 302 include one or more sub-DNN(s), generally labeled in this example as sub-DNN 1224, for processing portions of the carrier-aggregation-communications, other multiple component carrier communications, and/or split architecture communications. At times, the core network server 302 forms the sub-DNN 1224 as a portion of an E2E ML configuration, such as that described with reference to FIG. 10.

In various implementations, the core network server 302 and/or the base station 120 determine a configuration for the DNNs 1202, 1204, and 1206, such as through any combination of the core network neural network manager 312, the E2E ML controller 318, the network-slice manager 320, or the base station neural network manager 268. For instance, similar to that described with reference to FIG. 8, the core network server 302 or the base station 120 analyzes a neural network table using any combination of component carrier information, bandwidth information, current operating conditions, UE feedback, BS feedback, QoS requirements, metrics, and so forth, to determine the configuration for the DNNs 1202, 1204, and/or 1206. The UE 110 receives the configuration information, such as by receiving an indication of a neural network formation configuration as described with reference to FIG. 7, and forms the DNNs 1204. This can include the core network server 302 and/or the base station 120 determining updates to the DNNs 1204 (and/or the DNNs 1202 and DNNs 1206) based on feedback, where the updates can include large (e.g., architectural) changes or small (e.g., parameter) changes to the DNNs and/or sub-DNNs.

Figure 12:
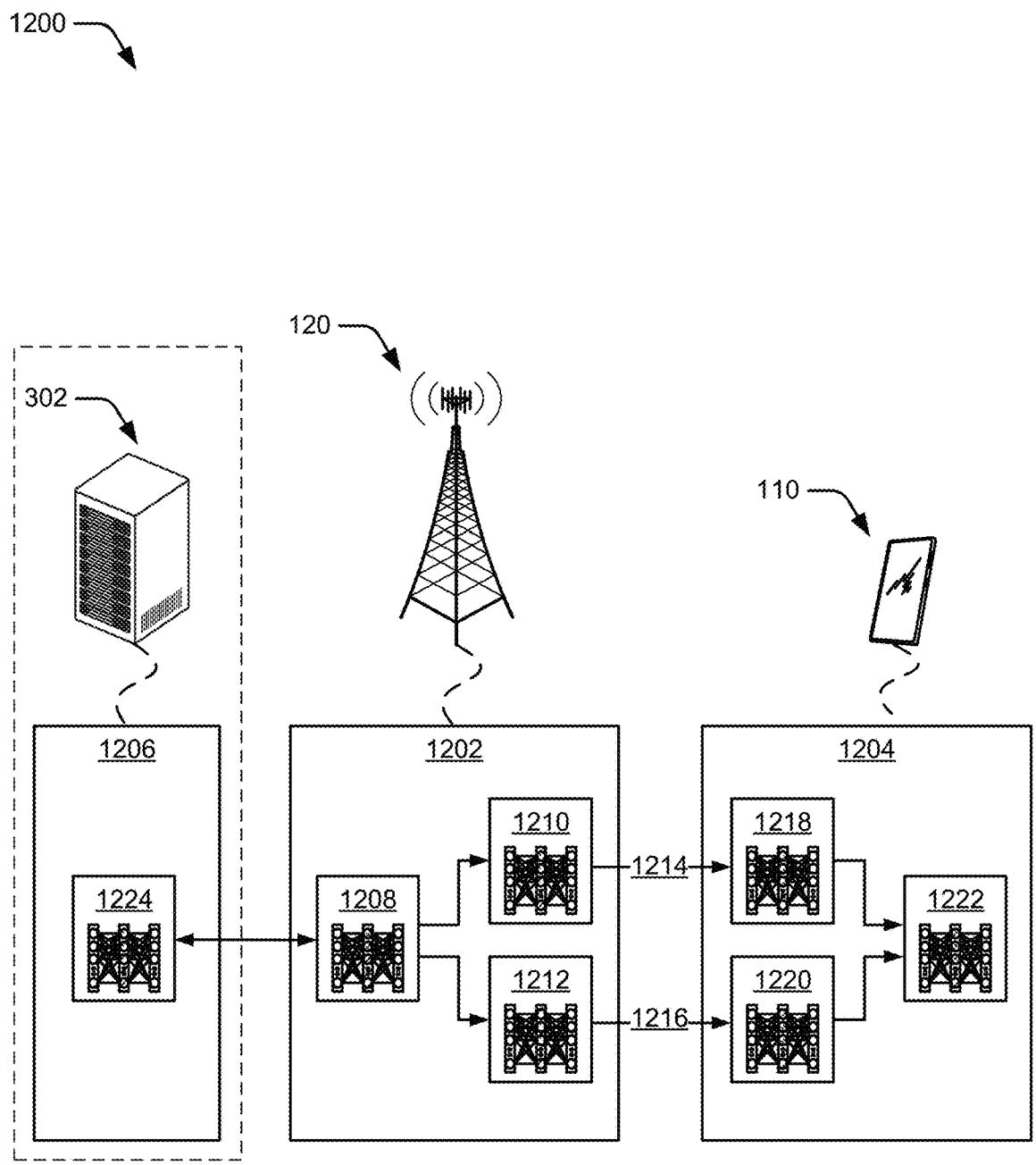
FIG. 12 illustrates an example environment in which various aspects of machine-learning architectures for simultaneous connection to multiple carriers can be implemented.
Figure 13:
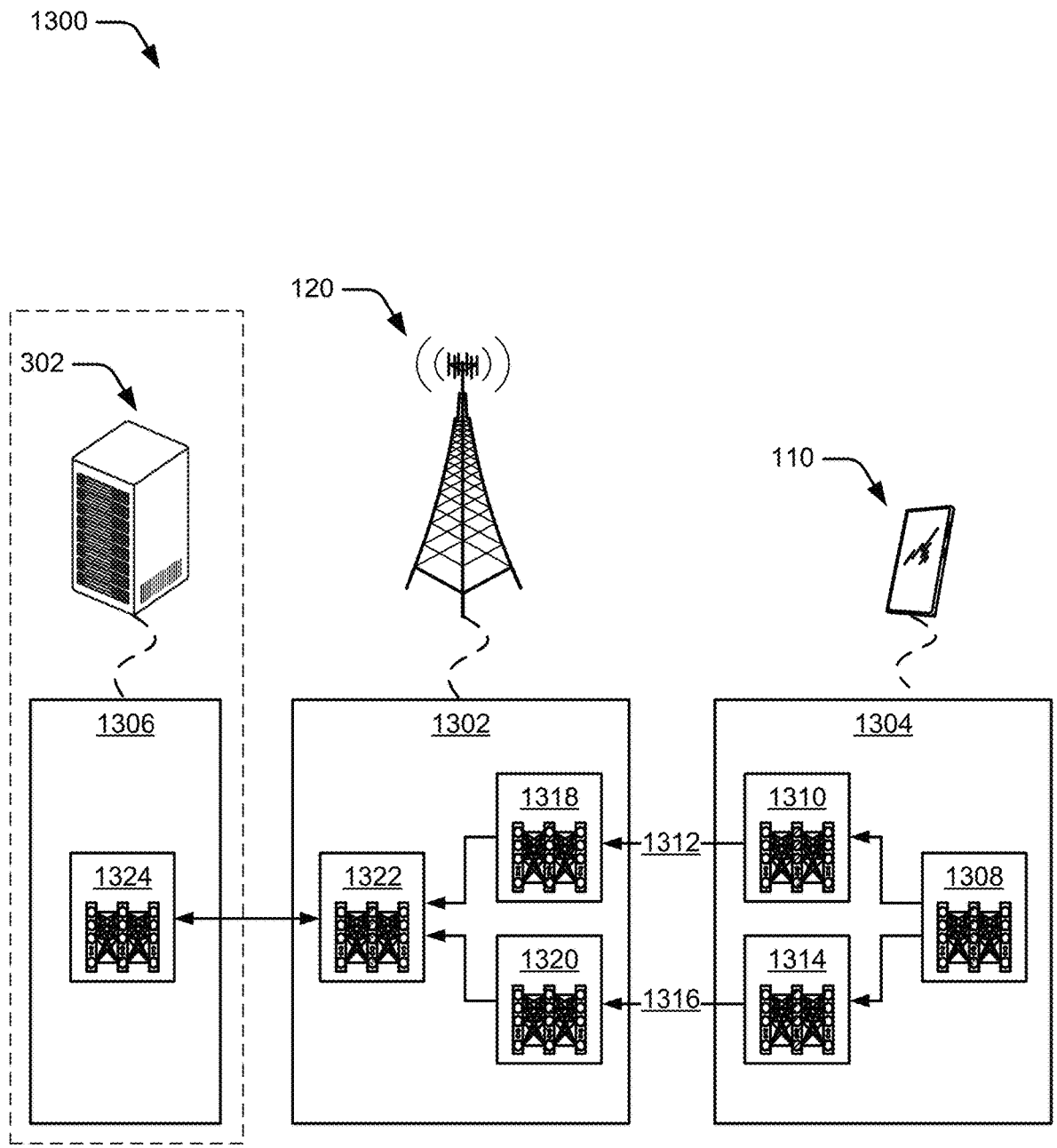
FIG. 13 illustrates an example environment in which various aspects of machine-learning architectures for simultaneous connection to multiple carriers can be implemented.

FIG. 13 illustrates an example environment 1300 that utilizes machine-learning architectures for simultaneous connection to multiple carriers in accordance with one or more implementations, such as carrier aggregation, dual connectivity, or other split architecture communications. In various implementations, the example environment 1300 works in conjunction with one or more aspects described with respect to the example environment 1200 of FIG. 12. In the environment 1300, the communications exchanged between devices correspond to uplink carrier aggregation communications. Similar to that described with respect to FIG. 12, the environment 1300 includes the base station 120 and the UE 110 of FIG. 1. At times, the environment 1300 optionally includes the core network server 302 of FIG. 3.

To perform operations associated with communicating information using carrier aggregation, the base station 120 includes one or more DNN(s) 1302 and the UE 110 includes one or more DNN(s) 1304. Similar to processing information exchanged using downlink carrier aggregation, the core network server 302 optionally includes one or more DNN(s) 1306.

In various implementations, the DNNs 1304 at the UE 110 perform similar operations to that described with respect to the DNNs 1202 at the base station 120 of FIG. 12. The DNNs 1304 can correspond to a single DNN, a portion of a distributed E2E DNN, or multiple sub-DNNs. For instance, the DNN(s) 1304 include, or perform equivalent operations corresponding to, a first sub-DNN 1308 that generates a split output for uplink carrier aggregation, a second sub-DNN 1310 that receives and processes a first output of the split output to generate a first component carrier 1312, and a third sub-DNN 1314 that receives and processes a second output of the split output to generate a second component carrier 1316. Alternately or additionally, the DNNs 1304 perform transmitter processing chain operations. At times, the sub-DNNs 1308, 1310, and 1314 are interchangeable/modularized as further described.

In implementations, the DNNs 1302 at the base station 120 perform complementary processing to the DNNs 1304 as described with respect to FIG. 6. At times, the DNN(s) 1302 include, or perform equivalent operations corresponding to, a first sub-DNN 1318 that receives and processes a first component carrier (e.g., the component carrier 1312), a second sub-DNN 1320 that receives and processes a second component carrier (e.g., the component carrier 1316), and a third sub-DNN 1322 that receives multiple inputs, and aggregates the information from the multiple inputs. Alternately or additionally, the DNNs 1302 perform receiver processing chain operations. The base station 120 sometimes forms the sub-DNNs 1318, 1320, and 1322 as distinct and separate (interchangeable) DNNs for performing specific processing operations (e.g., receiving and processing a first component carrier, receiving and processing a second component carrier, aggregating multiple inputs). Other times, the sub-DNNs 1318, 1320, and 1322 are implemented as a single, distinct DNN (e.g., DNN 1302) that performs processing equivalent to that described for the sub-DNNs, or a DNN formed from a portion of a distributed E2E ML configuration as further described.

Optionally, the core network server 302 includes one or more sub-DNN(s), generally labeled in this example as sub-DNN 1324, for processing portions of the carrier-aggregation-communications, other multiple component carrier communications, and/or split architecture communications. At times, the core network server 302 forms the sub-DNN 1324 as a portion of an E2E ML configuration, such as that described with reference to FIG. 10.

Having described ML architectures for simultaneous connection to multiple carriers, consider now a discussion of signaling and control transactions over a wireless communication system that can be used in various aspects of ML architectures for simultaneous connection to multiple carriers.

Figure 14:
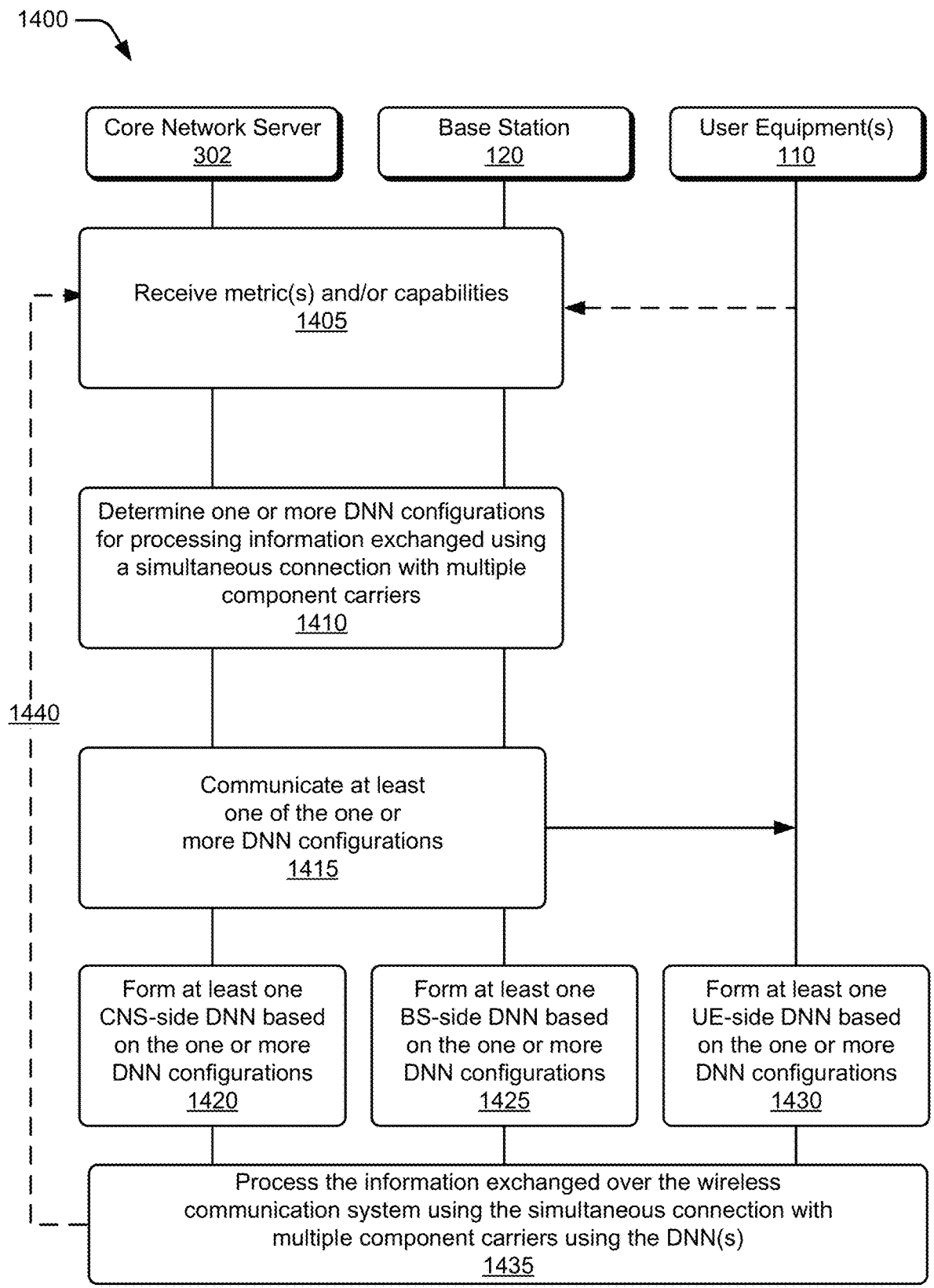
FIG. 14 illustrates an example transaction diagram between various devices in accordance with various implementations of machine-learning architectures for simultaneous connection to multiple carriers.
Figure 15:
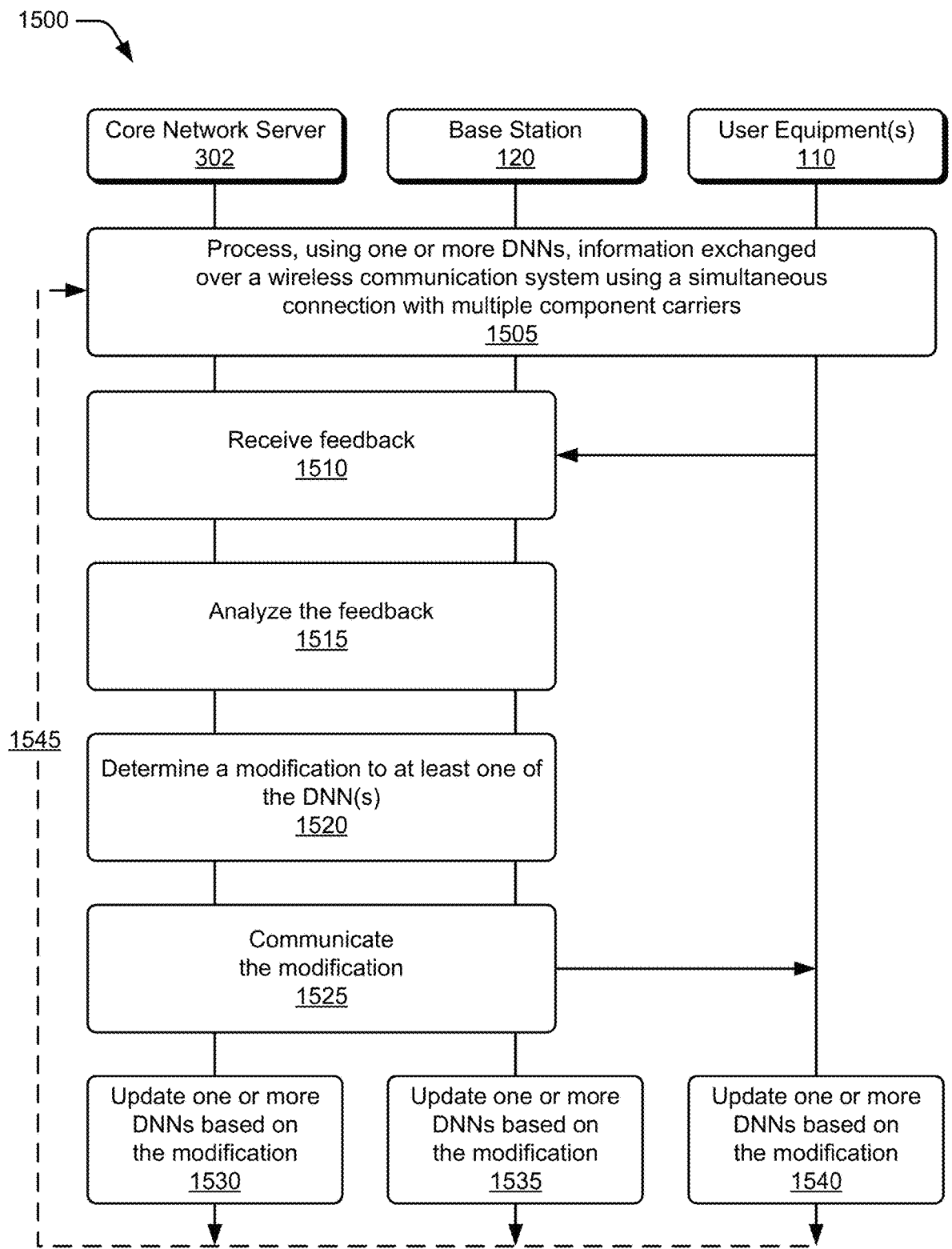
FIG. 15 illustrates an example transaction diagram between various devices in accordance with various implementations of machine-learning architectures for simultaneous connection to multiple carriers.

Signaling and Control Transactions for ML Architectures for Simultaneous Connection to Multiple Carriers FIGS. 14 and 15 illustrate example signaling and control transaction diagrams between a base station, a user equipment, and/or a core network server in accordance with one or more aspects of using machine-learning architectures for simultaneous connection to multiple carriers, such as carrier aggregation, dual connectivity, or other split architecture communications. The signaling and control transactions may be performed by the base station 120 and the UE 110 of FIG. 1, and/or the core network server 302 of FIG. 3, using elements of FIGS. 1-13.

A first example of signaling and control transactions of using machine-learning architectures for simultaneous connection to multiple carriers is illustrated by the signaling and control transaction diagram 1400 of FIG. 14. The diagram 1400 includes transactions that include the UE 110, the base station 120, and (optionally) core network server 302. Thus, various implementations include the core network server 302, while other implementations exclude the core network server 302. To indicate these implementations, various transactions span the core network server 302 and the base station 120 to designate that the corresponding transaction can be performed at the core network server 302 (only), the base station 120 (only), or a combination of the core network server 302 and the base station 120 through interactions with one another. This is further denoted through the use of "core network server 302/base station 120".

At 1405, the core network server 302/base station 120 optionally receives metrics and/or UE capabilities from the UE 110. For instance, the base station 120 receives UE capabilities from the UE 110 in response to sending a request for UE capabilities. Alternately or additionally, the core network server 302 receives the UE capabilities or the UE metrics from the UE 110 through the base station 120. In some implementations, the UE capabilities include ML-related capabilities, such as a maximum kernel size capability, a memory limitation, a computation capability, supported ML architectures, supported number of layers, available processing power, memory limitation, available power budget, and fixed-point processing versus floating point processing. Alternately or additionally, the UE capabilities include carrier aggregation capabilities, dual connectivity capabilities, and so forth. As another example, the base station 120 receives UE metrics from the UE 110, such as power measurements (e.g., RSSI), error metrics, timing metrics, QoS, latency, a Reference Signal Receive Power (RSRP), SINR information, CQI, CSI, Doppler feedback, etc.

In some implementations, the core network server 302 receives BS metrics from the base station 120 that are based on communications that the base station exchanges with the UE 110 as described with reference to FIG. 8. The core network server 302 can also receive BS capabilities from the base station 120, such as processing power, power state, capacity (e.g., supportable number of connections), working range, and so forth.

At 1410, the core network server 302/base station 120 (by way of the BS neural network manager 268, the core network neural network manager 312, the E2E ML controller 318, the network-slice manager 320, an E2E ML controller implemented by the base station, and/or a network-slice manager implemented by the base station) determines one or more DNN configurations for processing a simultaneous connection to multiple component carrier, such as one or more DNN configurations for carrier-aggregation-communications. The DNN configuration(s) can include a (partitioned) E2E ML configuration, multiple sub-DNN configurations, and/or multiple DNN configurations for multiple devices. For instance, with reference to FIG. 12, the core network server 302/base station 120 can determine a first sub-DNN configuration used to form the sub-DNN 1208, a second sub-DNN configuration used to form the sub-DNN 1210, and a third sub-DNN configuration used to form the sub-DNN 1212. In some implementations, the core network server 302/base station 120 determines distinct DNN configurations, such as a first DNN configuration that forms the DNNs 1302 at the base station 120, a second DNN configuration that forms the DNNs 1304, and so forth, with reference to FIG. 13. The DNN configurations can form sub-DNNs (or portions of a DNN) that perform different processing operations from one another, such as a first sub-DNN that processes a first component carrier in licensed band and a second sub-DNN that processes a second component in an unlicensed band.

In some implementations, the core network server 302/base station 120 determines the DNN configuration(s) based on characteristics about the multiple component carriers, such as characteristics about carrier aggregation and whether the carrier aggregation corresponds to contiguous Intra-RAT carrier aggregation, non-contiguous Intra-RAT carrier aggregation, or non-contiguous Inter-RAT carrier aggregation. Alternately or additionally, the core network server 302/base station 120 determines the DNN configuration(s) based on the UE capabilities received at 1405, such as carrier aggregation capabilities or dual connectivity capabilities.

At 1415, the core network server 302/base station 120 communicates at least one of the DNN configuration(s) to the UE 110 and/or the base station 120. This can include communicating a sub-DNN configuration, a partition of an E2E ML configuration, or a single DNN configuration that performs all UE-related carrier aggregation processing. As described at 715 with reference to FIG. 7, the base station (and/or core network server) sometimes communicates the DNN configuration(s) by transmitting a message that indicates a neural network formation configuration and/or an indication to form a DNN based on the neural network formation configuration. In implementations, the core network server 302/base station 120 transmits one or more index values that map to entries in a neural network table. This can include the core network server 302/base station 120 communicating a component-carrier-index-value that maps to a neural network formation configuration for a specific component carrier as further described. Alternately or additionally, the core network server 302/base station 120 transmits a message that includes neural network parameter configurations (e.g., weight values, coefficient values, number of filters).

In some implementations, the base station 120 (and/or the core network server 302 by way of the base station 120) communicates the configuration of the DNN to the UE 110 using a first component carrier, where the DNN configuration corresponds to forming a DNN for processing a second component carrier of the carrier aggregation. For instance, consider again the example in which the base station 120 exchanges information with the UE 110 using a single component carrier, where the base station uses the sub-DNN 1208 and the sub-DNN 1210 to generate and transmit information using the first component carrier 1214. Similarly, the UE 110 uses the sub-DNN 1218 and the sub-DNN 1222 to process the information exchanged using the first component carrier. In various implementations, the base station 120 communicates a sub-DNN configuration for a DNN that processes a second component carrier over the first component carrier 1214. For instance, the base station 120 transmits the sub-DNN configuration (for the DNN that processes the second component carrier) using Layer 1 or Layer 2 control channels associated with the first component carrier.

At 1420, the core network server 302 optionally forms at least one core-network-server-side deep neural network (CNS-side DNN) based on at least one of the DNN configurations determined at 1410, where the CNS-side DNN can include multiple sub-DNNs, be a distinct DNN, or be part of a distributed DNN. In implementations, the CNS-side DNN(s) perform at least some processing for exchanging information over a wireless communication system using a simultaneous connection to multiple component carriers (e.g., carrier aggregation), which can include pre-transmission processing.

At 1425, the base station 120 forms at least one base-station-side deep neural network (BS-side DNN) based on the DNN configuration(s) determined at 1410. The BS-side DNN can include multiple sub-DNNs, be a distinct DNN, or be part of a distributed DNN. In implementations, the BS-side DNN(s) formed by the base station perform at least some processing for exchanging information over a wireless communication system using a simultaneous connection to multiple component carriers, including pre-transmission processing.

Similarly, at 1430, the UE 110 forms at least one user-equipment-side deep-neural-network (UE-side DNN) based on the one or more DNN configurations determined at 1410, where the UE-side DNN can include multiple sub-DNNs, be a distinct DNN, or be part of a distributed DNN. In implementations, the UE 110 accesses a neural network table using information received at 1520 to obtain one or more architectures and/or parameters as described with reference to FIG. 8. In implementations, the DNN formed by the UE 110 performs at least some processing for exchanging information over a wireless communication system using a simultaneous connection to multiple component carriers.

Afterwards, at 1435, the core network server 302/base station 120 and the UE 110 process the simultaneous connection to multiple component carriers using the DNNs, such as that described with reference to FIGS. 10-13. In implementations, the core network server 302/base station 120 and/or the UE 110 iteratively perform the signaling and control transactions described in the signaling and control transaction diagram 1400, signified by dashed line 1440. These iterations allow the base station 120 and/or the UE 110 to dynamically modify the DNNs processing the information exchanged using the simultaneous connection to multiple component carriers (e.g., carrier aggregation, dual connectivity) based upon changing operating conditions, and improve the performance of the exchanges, as further described.

Changing operating conditions impact the performance of how well each DNN processes information. To illustrate, and with reference to FIG. 8, the training module 270 and/or the training module 314 generate neural network formation configurations based on operating conditions as described by the input characteristics. This includes operating conditions corresponding to exchanging information over the wireless communication system using multiple component carriers. As current operating conditions deviate, the performance of the DNN begins to deteriorate.

Various implementations modify one or more DNNs based on feedback from a UE and/or a base station. The modifications can include architectural changes and/or parameter changes to the DNN(s). To demonstrate, consider now a second example of signaling and control transactions of using machine-learning architectures for simultaneous connection to multiple carriers, illustrated in FIG. 15 by the signaling and control transaction diagram 1500. In some implementations, the signaling and control transaction diagram 1500 represents a continuation of the signaling and control transaction diagram 1400 of FIG. 14. Accordingly, the diagram 1500 includes transactions that include the UE 110, the base station 120, and (optionally) core network server 302, where various transactions can be performed at the core network server 302 (only), the base station 120 (only), or a combination of the core network server 302 and the base station 120 through interactions with one another. This is further denoted through the use of "core network server 302/base station 120".

At 1505, the core network server 302/base station 120 and the UE 110 process, using one or more DNNs, information exchanged over a wireless communication system using a simultaneous connection to multiple component carriers. In some implementations, the processing performed at 1505 corresponds to the processing performed at 1435 of FIG. 14.

At 1510, the core network server 302/base station 120 receives feedback from the UE 110. For example, the UE 110 communicates one or more metrics, such as BLER, SINR, CQI feedback, or a packet loss rate to the base station 120 (and/or the core network server 302 through the base station 120). Alternately or additionally, the base station 120 generates one or more metrics, such as a Round-Trip Time (RTT) latency metric, uplink received power, uplink SINR, uplink packet errors, uplink throughput, timing measurements, power information, SINR information, CQI, CSI, or Doppler feedback, and sends the metrics as feedback to the core network server 302.

At 1515, the core network server 302/base station 120 analyzes the feedback. For example, the core network server 302/base station 120 (by way of the BS neural network manager 268, the core network neural network manager 312, the E2E ML controller 318, the network-slice manager 320, an E2E ML controller implemented by the base station, and/or a network-slice manager implemented by the base station) analyzes the feedback to determine whether modifications to the DNNs would improve an overall performance of exchanging the information using multiple component carriers.

At 1520, the core network server 302/base station 120 (by way of the BS neural network manager 268, the core network neural network manager 312, the E2E ML controller 318, the network-slice manager 320, an E2E ML controller implemented by the base station, and/or a network-slice manager implemented by the base station) determines a modification to at least one of the DNN(s) based on the feedback. In some implementations, the core network server 302/base station 120 determines a large modification that changes an architecture configuration of the DNNs. Alternately or additionally, the core network server 302/base station 120 determines a small modification that corresponds to changing parameter configurations without changing the architecture configuration, such as changing coefficient values, weights, or kernel sizes. The modification can correspond to DNNs formed from a partitioned E2E ML configuration, modifications to one or more sub-DNNs, or modifications to distinct DNNs.

At 1525, core network server 302/base station 120 communicates the modification to the UE 110. For instance, similar to that described at 1415 of FIG. 14, the base station transmits a message to the UE 110, where the message indicates a neural network formation configuration corresponding to the modification. Alternately or additionally, the core network server 302 communicates the modification to the base station 120 and/or the UE 110 (by way of the base station 120). The indication can include one or more index values that map to entries in a neural network table. At times, the message includes a component-carrier-index-value that maps to neural network table information for a specific component carrier as further described. Other times, the message. includes neural network parameter values (e.g., weight values, coefficient values, number of filters.

At 1530, the core network server 302 (optionally) updates one or more DNNs based on the modification. Similarly, at 1535 and 1540, respectively, the base station 120 (optionally) updates one or more DNNs based on the modification and the UE 110 updates one or more DNNs based on the modification. The core network server 302, the base station 120, and/or the UE 110 update any combination of sub-DNNs, distributed DNNs based on a partitioned E2E ML configuration, and/or distinct DNNs. In implementations, the core network server 302, the base station 120, and the UE(s) 110 iteratively perform the signaling and control transactions described in the signaling and control transaction diagram 1500, signified with dashed line 1545. These iterations allow the core network server 302, the base station 120 and/or the UE(s) 110 to dynamically modify the DNNs processing the information exchanged over the wireless communication system using multiple component carrier communications based upon changing operating conditions, and improve an overall performance, as further described.

Example Methods

Example methods 1600 and 1700 are described with reference to FIG. 16 and FIG. 17 in accordance with one or more aspects of machine-learning architectures for simultaneous connection to multiple carriers, other types of communications that use multiple component carriers, and/or other split architecture communications. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 16:
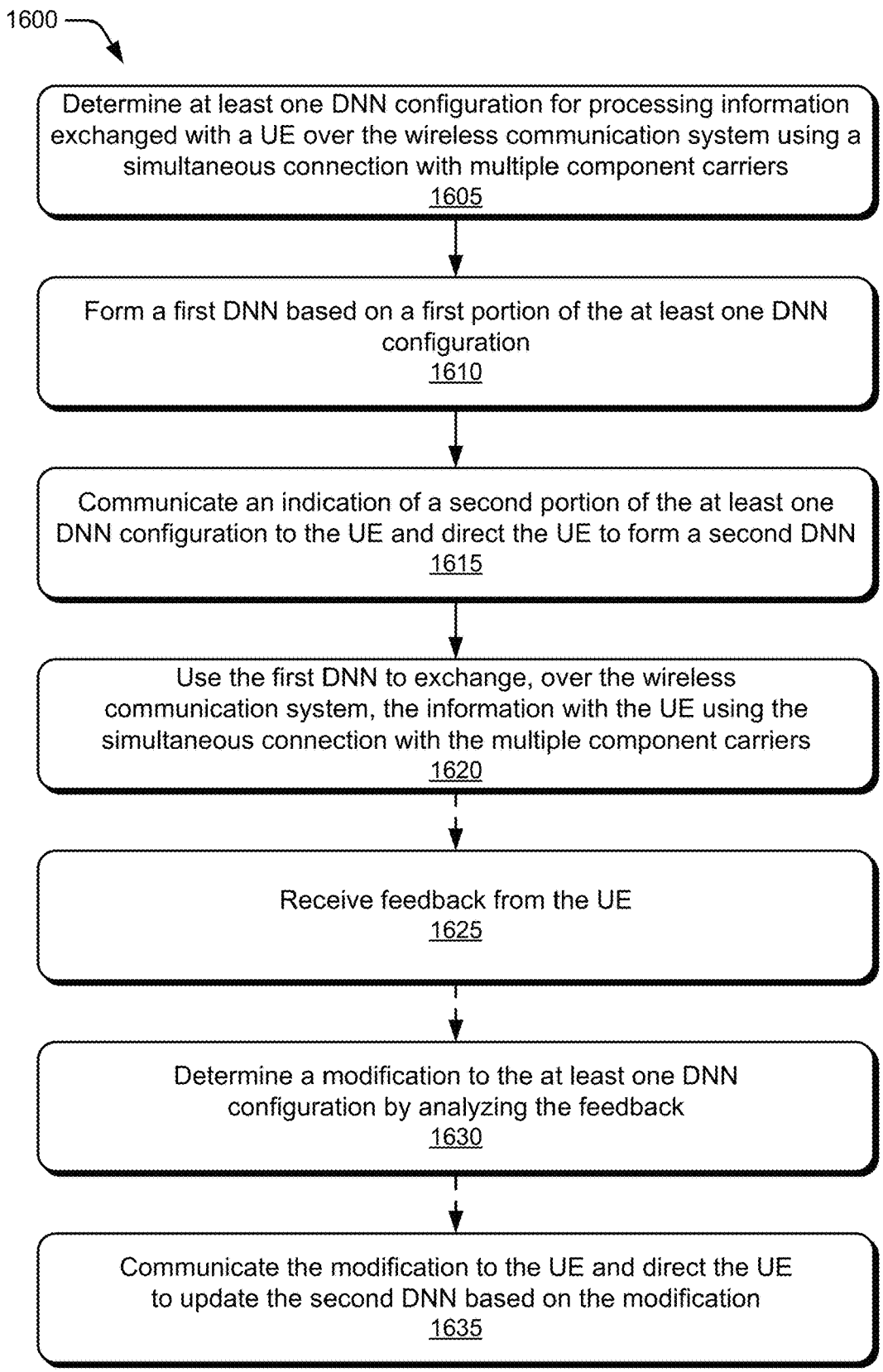
FIG. 16 illustrates an example method for using machine-learning architectures for simultaneous connection to multiple carriers.

FIG. 16 illustrates an example method 1600 for using a machine-learning architecture for simultaneous connection to multiple carriers, other types of communications that use multiple component carriers, and/or other split architecture communications. In some implementations, operations of method 1600 are performed by a network entity, such as any one of the base stations 120 or the core network server 302.

At 1605, the network entity determines at least one DNN configuration for processing information exchanged with a UE over the wireless communication system using a simultaneous connection to multiple component carriers, such as that described at 1410 of FIG. 14. In implementations, the multiple component carriers include at least a first component carrier and a second component carrier, but additional component carriers can be included. In one or more implementations, the network entity (e.g., core network server 302) determines an E2E ML configuration for exchanging communications using a simultaneous connection to multiple component carriers (e.g., at 1410) with the UE 110. As another example, the network entity (e.g., base station 120) determines the configuration of one or more DNNs (e.g., at 710), such as a first configuration for a BS-side DNN and a second configuration for a UE-side DNN that performs complementary operations to one another. At times, the network entity determines multiple sub-DNN configurations, such as a first sub-DNN configuration for forming a first sub-DNN (sub-DNN 1208, sub-DNN 1308) that generates a split output, a second sub-DNN configuration for forming a second sub-DNN that processes a first component carrier (sub-DNN 1210, sub-DNN 1310), a third sub-DNN configuration for forming a third sub-DNN that processes a second component carrier (sub-DNN 1212, sub-DNN 1314), a fourth sub-DNN configuration for forming a fourth sub-DNN that aggregates multiple inputs (sub-DNN 1222, sub-DNN 1322), and so forth.

In determining the DNN configuration(s), some implementations of the network entity determine DNN configuration(s) for processing downlink carrier aggregation. For instance, the network entity determines DNN configuration(s) for processing downlink carrier aggregation that exchanges information using a first component carrier in a licensed band and a second component carrier in an unlicensed band. The DNN configuration(s) can include a first DNN configuration that forms a first DNN that generates a split output that includes a first output associated with the first component carrier and a second output associated with the second component carrier. Alternately or additionally, the DNN configuration(s) include a second DNN configuration that forms a second DNN that aggregates a first input associated with the first component carrier and a second input associated with the second component carrier. In various implementations, the network entity determines DNN configuration(s) for processing uplink carrier aggregation. At times, determining the DNN configuration(s) can be based on a count or number of component carriers included in the communications.

At 1610, the network entity forms at least a first DNN based on a first portion of the at least one DNN configuration, such as that described at 1420 and at 1425 of FIG. 14. In implementations, the network entity (core network server 302) forms a CNS-side DNN (e.g., DNN(s) 1206, DNN(s) 1306), where the CNS-side DNN can be a distributed DNN based on a partition of an E2E ML configuration, include sub-DNNs, or be a distinct DNN. As another example, the network entity (e.g., base station 120) forms one or more BS-side DNNs (e.g., DNN(s) 1202, DNN(s) 1302). Similar to the CNS-side DNN, the BS-side DNN(s) can be a distributed DNN based on a partition of an E2E ML configuration, include sub-DNNs, or be a distinct DNN. In implementations, the network entity accesses a neural network table to obtain one or more architecture and/or parameter configurations. In response to obtaining the configurations, the network entity forms the network entity DNN using the architecture and/or parameter configurations.

At 1615, the network entity communicates an indication of a second portion of the DNN configuration(s) to the UE and directs the UE to form a second DNN. For example, similar to that described at 715 of FIG. 7, the network entity (e.g., core network server, base station 120) communicates one or more index values to the UE (e.g., UE 110) that map to entries of a neural network table to provide the UE with a neural network formation configuration. Alternately or additionally, the network entity communicates a component-carrier-index-value to the UE. The indication can include a command that directs the UE 110 to form the second DNN using the neural network formation configuration indicated by the index value(s). In some implementations, the second portion of the DNN configuration(s) includes a (modularized) sub-DNN configuration that forms a sub-DNN to process the information exchanged using the second component carrier. At times, the network entity communicates the indication of the second portion using the first component carrier.

At 1620, the network entity uses the at least first DNN to exchange, over the wireless communication system, the information with the UE using the simultaneous connection to the multiple component carriers. For example, the network entity (e.g., the core network server 302, the base station 120) uses the first DNN to perform transmitter processing chain operations associated with carrier aggregation, including pre-transmission processing, such as that described with reference to FIG. 6.

At 1625, the network entity optionally receives feedback from the UE. As one example, the network entity (e.g., the base station 120) receives one or more UE metrics (e.g., power information, SINR information, CQI, CSI, Doppler feedback, QoS, latency) from the UE (e.g., UE 110) that are based on downlink communications exchanged with the base station 120. As another example, the network entity (e.g., the core network server 302) receives the one or more UE metrics from the UE (e.g., UE 110) by way of the base station 120. Alternately or additionally, the network entity (e.g., core network server 302) receives BS metrics from the base station 120, such as uplink received power, uplink SINR, uplink packet errors, uplink throughput, timing measurements, power information, SINR information, CQI, CSI, Doppler feedback, QoS, latency, etc.

At 1630, the network entity optionally determines a modification to the DNN configuration(s) by analyzing the feedback. In implementations, the network entity (e.g., core network server 302, base station 120) analyzes a neural network table based on the feedback to determine the modification. This includes determining a large modification that corresponds to one or more architectural changes to the DNN configuration(s), or a smaller modification that corresponds to one or more parameter changes to a fixed DNN architecture of the DNN configuration(s).

At 1635, the network entity optionally communicates the modification to the UE and directs the UE to update the second DNN based on the modification. For instance, the network entity (e.g., core network server 302, base station 120) communicates one or more index values to the UE (e.g., UE 110) that map to entries of a neural network table, communicates a component-carrier-index-value, and/or communicates parameter values as further described.

FIG. 17 illustrates an example method 1700 for using a machine-learning architecture for simultaneous connection to multiple carriers. In some implementations, operations of method 1700 are performed by a user equipment, such as UE 110 of FIG. 1

At 1705, the UE receives an indication of at least one DNN configuration for processing information exchanged over a wireless communication system using a simultaneous connection to multiple carriers, such as carrier aggregation or dual connectivity. For instance, the UE (e.g., UE 110) receives, from a network entity (e.g., core network server 302, base station 120), a message that includes an index value that maps into a neural network table. Alternately or additionally, the indication includes a component-carrier-index-value that maps to neural network table information for a particular component carrier. The DNN configuration(s) can include any combination of a portion of an E2E ML configuration, one or more sub-DNN configurations, or a distinct DNN configuration. In implementations, the multiple component carriers include at least a first component carrier and a second component carrier, but additional component carriers can be included.

At 1710, the UE forms at least one DNN based on the indication. As one example, the UE (e.g., UE 110) forms DNN(s) to process downlink carrier aggregation. As another example, the UE (e.g., UE 110) forms DNN(s) to process uplink carrier aggregations. To illustrate, with respect to forming DNNs for downlink carrier aggregation, in at least one implementation, the UE forms a first sub-DNN (e.g., sub-DNN 1218) to generate a first input, a second sub-DNN (e.g., sub-DNN 1220) to generate the second input, and a third sub DNN (e.g., sub-DNN 1222) to receive the first input and the second input and aggregate the first input and the second input to recover information exchanged over the wireless communication system. Alternately or additionally, the UE forms a single DNN (e.g., DNN 1204) that performs operations corresponding to multiple sub-DNNs. At times, the UE forms a DNN based on a portion of a distributed E2E ML configuration. In some implementations, the indication corresponds to an update to the first sub-DNN or the second sub-DNN, and the UE forms the DNN(s) by updating the first or second sub-DNN.

At 1715, the UE uses the DNN(s) to process the information exchanged over the wireless communication system using the simultaneous connection to the multiple component carriers. In at least one implementation, the UE (e.g., UE 110) processes information exchanged using downlink carrier aggregation, such as that described with reference to FIG. 12. Alternately or additionally, the UE (e.g., UE 110) processes information exchanged using uplink carrier aggregation, such as that described with reference to FIG. 13. For instance, with reference to uplink carrier aggregation, the UE generates, using the DNN(s) (e.g., sub-DNN 1310), a first output associated with the first component carrier to exchange a first portion of the information over the wireless communication system. As part of the DNN(s) for uplink carrier aggregation, the UE generates, using the DNN(s) (e.g., sub-DNN 1310), a second output associated with the second component carrier to exchange a second portion of the information over the wireless communication system. At times, and with reference to downlink carrier aggregation, the UE processes, using a first DNN (e.g., sub-DNN 1218) a first portion of the information exchanged using the first component carrier to generate a first input, processes, using a second DNN (e.g., sub-DNN 1220) a second portion of the information exchanged using the second component carrier to generate a second input, and aggregates, using a third DNN (e.g., sub-DNN 1222), the first input and the second input to recover the information.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Although techniques and devices for machine-learning architectures for simultaneous connection to multiple carriers, other types of communications that use multiple component carriers, and/or other split architecture communications, have been described in language specific to features and/or methods, the subject of the appended claims is not necessarily limited to the specific features or methods described. Rather, the specific features and methods are disclosed as example implementations of machine-learning architectures for simultaneous connection to multiple carriers.

In the following, several examples are described:

Example 1: A method performed by a network entity associated with a wireless communication system, the method comprising: determining at least one deep neural network (DNN) configuration for processing information exchanged with a user equipment (UE) over the wireless communication system using a simultaneous connection to multiple component carriers that include a first component carrier and a second component carrier, the at least one DNN configuration including a first portion of the at least one DNN configuration for forming a first DNN at the network entity, and a second portion of the at least one DNN configuration for forming a second DNN at the UE; forming the first DNN based on the first portion; communicating an indication of the second portion to the UE and directing the UE to form the second DNN based on the second portion; and using the first DNN to exchange, over the wireless communication system, the information with the UE using the simultaneous connection to the multiple component carriers.

Example 2: The method as recited in example 1, wherein the first component carrier is in a licensed band, and wherein the second component carrier is in an unlicensed band.

Example 3: The method as recited in example 1, wherein the simultaneous connection to the multiple component carriers is downlink carrier aggregation, and wherein determining the at least one DNN configuration comprises: determining, for the first portion, a first DNN configuration that forms the first DNN to process the information by generating a split output that includes a first output associated with the first component carrier and a second output associated with the second component carrier; and determining, for the second portion, a second DNN configuration that forms the second DNN to process the information by aggregating a first input associated with the first component carrier and a second input associated with the second component carrier.

Example 4: The method as recited in example 3, wherein determining the first DNN configuration comprises: determining a first sub-DNN configuration for forming a first sub-DNN that generates the split output; determining a second sub-DNN configuration for forming a second sub-DNN that processes, based on the first output, the information exchanged using the first component carrier; and determining a third sub-DNN configuration for forming a third sub-DNN that processes, based on the second output, the information exchanged using the second component carrier.

Example 5: The method as recited in example 1, wherein the simultaneous connection to the multiple component carriers is uplink carrier aggregation, and wherein determining the at least one DNN configuration comprises: determining, for the first portion, a first DNN configuration that forms the first DNN to process the information by aggregating multiple inputs that include a first input associated with the first component carrier and a second input associated with the second component carrier; and determining, for the second portion, a second DNN configuration that forms the second DNN to process the information by generating a split output that includes a first output associated with the first component carrier and a second component carrier.

Example 6: The method as recited in example 1, wherein the determining the at least one DNN configuration is based, at least in part, on a count of component carriers included in the multiple component carriers.

Example 7: The method as recited in example 1, wherein the determining the at least one DNN configuration further comprises: determining an end-to-end machine-learning configuration (E2E ML configuration) as the at least one DNN configuration.

Example 8: The method as recited in example 7, wherein the first portion comprises a first partition of the E2E ML configuration, and wherein the second portion comprises a second partition of the E2E ML configuration.

Example 9: The method as recited in example 1, wherein the second portion of the at least one DNN configuration includes a sub-DNN configuration that forms a sub-DNN to process the information exchanged using the second component carrier, and wherein the communicating the indication of the second portion to the UE comprises: communicating, using the first component carrier, the sub-DNN configuration that forms the sub-DNN to process the information exchanged using the second component carrier.

Example 10: The method as recited in example 1, further comprising: receiving feedback from the UE; determining a modification to the at least one DNN configuration by analyzing the feedback; and communicating the modification to the UE and directing the UE to update the second DNN based on the modification.

Example 11: A method performed by a user equipment (UE) associated with a wireless communication system, the method comprising: receiving an indication of at least one deep neural network (DNN) configuration for processing information exchanged over the wireless communication system using a simultaneous connection to multiple component carriers that include a first component carrier and a second component carrier; forming, at the UE, at least one DNN based on the indication; and using the at least one DNN to process the information exchanged over the wireless communication system using the simultaneous connection to the multiple component carriers.

Example 12: The method as recited in example 11, wherein the simultaneous connection to the multiple component carriers comprises downlink carrier aggregation, and wherein using the at least one DNN to process the information comprises: processing, using the at least one DNN, a first portion of the information exchanged using the first component carrier to generate a first input; processing, using the at least one DNN, a second portion of the information exchanged using the second component carrier to generate a second input; and aggregating, using the at least one DNN, the first input and the second input to recover the information.

Example 13: The method as recited in example 12, wherein processing the first portion of the information comprises processing the information using a first sub-DNN to generate the first input; wherein processing the second portion comprises processing the information using a second sub-DNN to generate the second input; and wherein aggregating the first input and the second input comprises using a third sub DNN to receive the first input and the second input and aggregate the first input and the second input to recover the information.

Example 14: The method as recited in example 13, wherein the indication comprises a first indication, and the method further comprises: receiving a second indication that indicates a modification to the first sub-DNN, the second sub-DNN, or the third sub-DNN; and updating the first sub-DNN, the second sub-DNN, or the third sub-DNN based on the second indication.

Example 15: The method as recited in example 11, wherein the simultaneous connection to the multiple component carriers comprises uplink carrier aggregation, and wherein using the at least one DNN to process the information comprises: generating, using the at least one DNN, a first output associated with the first component carrier to exchange a first portion of the information over the wireless communication system; and generating, using the at least one DNN, a second output associated with the second component carrier to exchange a second portion of the information over the wireless communication system.

Example 16: The method as recited in example 15, wherein forming the at least one DNN comprises: forming the at least one DNN based on a portion of a distributed end-to-end machine-learning configuration.

Example 17: The method as recited in example 11, wherein the first component carrier is in a licensed band, and wherein the second component carrier is in an unlicensed band.

Example 18: A network entity apparatus comprising: a processor; and computer-readable storage media comprising instructions that direct the network entity apparatus to perform operations comprising: determining at least one deep neural network (DNN) configuration for processing information exchanged with a user equipment (UE) over a wireless communication system using a simultaneous connection to multiple component carriers that include a first component carrier and a second component carrier, the at least one DNN configuration including a first portion for forming a first DNN at the network entity apparatus, and a second portion for forming a second DNN at the UE; communicating an indication of the second portion to the UE and directing the UE to form the second DNN based on the second portion; forming the first DNN based on the first portion of the DNN configuration; and using the first DNN to exchange the information, over the wireless communication system and with the UE, using the simultaneous connection to the multiple component carriers.

Example 19: The network entity apparatus as recited in example 18, the operations further comprising: receiving feedback from the UE; determining a modification to the at least one DNN configuration by analyzing the feedback; and communicating the modification to the UE and directing the UE to update the second DNN based on the modification.

Example 20: The network entity apparatus as recited in example 19, wherein the determining the modification comprises: determining one or more architectural changes to the at least one DNN configuration; or determining one or more parameter changes to the at least one DNN configuration.

Example 21: The network entity apparatus as recited in example 18, wherein determining the at least one DNN configuration comprises: determining, for the first portion, a first DNN configuration that forms the first DNN to process the information by generating a split output that includes a first output associated with the first component carrier and a second output associated with the second component carrier; and determining, for the second portion, a second DNN configuration that forms the second DNN to process the information by aggregating a first input associated with the first component carrier and a second input associated with the second component carrier.

What is claimed is:

1. A method performed by a network entity associated with a wireless communication system, the method comprising:

determining at least one deep neural network (DNN) configuration for processing information exchanged with a user equipment (UE) over the wireless communication system using a simultaneous connection to a first component carrier and a second component carrier, the at least one DNN configuration including:
- a first portion for forming a first DNN that generates a first output associated with the first component carrier at the network entity and a second output associated with the second component carrier;
- a second portion forming a second DNN at the UE;
- communicating, to the UE, an indication of the second portion; and
- using the first DNN to exchange, over the wireless communication system, the information with the UE using the simultaneous connection to the first component carrier and the second component carrier.

2. The method as recited in claim 1, wherein the first component carrier is in a licensed band, and
wherein the second component carrier is in an unlicensed band.

3. The method as recited in claim 1, wherein the simultaneous connection to the first component carrier and the second component carrier is downlink carrier aggregation, and
wherein determining the at least one DNN configuration comprises:
- determining, for the second portion, a second DNN configuration that forms the second DNN to process the information by aggregating a first input associated with the first component carrier and a second input associated with the second component carrier.

4. The method as recited in claim 3, further comprising:
- determining a first sub-DNN configuration for forming a first sub-DNN that generates a split output including the first output and the second output;
- determining a second sub-DNN configuration for forming a second sub-DNN that processes, based on the first output associated with the first component carrier, the information exchanged using the first component carrier; and
- determining a third sub-DNN configuration for forming a third sub-DNN that processes, based on the second output associated with the second component carrier, the information exchanged using the second component carrier.

5. The method as recited in claim 1, wherein the simultaneous connection to the first component carrier and the second carrier is uplink carrier aggregation, and
wherein the first DNN processes the information by aggregating a first input associated with the first component carrier and a second input associated with the second component carrier.

6. The method as recited in claim 1, wherein the determining the at least one DNN configuration is based, at least in part, on a count of component carriers included in the simultaneous connection.

7. The method as recited in claim 1, wherein the determining the at least one DNN configuration further comprises:
- determining an end-to-end machine-learning configuration (E2E ML configuration) as the at least one DNN configuration.

8. The method as recited in claim 1, wherein the second portion includes a sub-DNN configuration that forms a sub-DNN to process the information exchanged using the second component carrier, and
wherein the communicating the indication of the second portion to the UE comprises:
- communicating, using the first component carrier, the sub-DNN configuration that forms the sub-DNN to process the information exchanged using the second component carrier.

9. The method as recited in claim 1, further comprising:
- receiving feedback from the UE;
- determining a modification to the at least one DNN configuration by analyzing the feedback; and
- communicating the modification to the UE for updating the second DNN based on the modification.

10. A method performed by a user equipment (UE) associated with a wireless communication system, the method comprising:
- receiving an indication of at least one deep neural network (DNN) configuration for processing information exchanged over the wireless communication system using a simultaneous connection to multiple component carriers that include a first component carrier and a second component carrier;
- forming, at the UE, at least one DNN based on the indication; and
- using the at least one DNN to process the information exchanged over the wireless communication system using the simultaneous connection to the multiple component carriers by aggregating multiple inputs of the at least one DNN.

11. The method as recited in claim 10, wherein the simultaneous connection to the multiple component carriers comprises downlink carrier aggregation, and
wherein using the at least one DNN to process the information comprises:
- processing, using the at least one DNN, a first portion of the information exchanged using the first component carrier to generate a first input of the multiple inputs;
- processing, using the at least one DNN, a second portion of the information exchanged using the second component carrier to generate a second input of the multiple inputs; and
- aggregating, using the at least one DNN, the first input and the second input to recover the information.

12. The method as recited in claim 11, wherein processing the first portion of the information comprises using a first sub-DNN to generate the first input;
wherein processing the second portion comprises using a second sub-DNN to generate the second input; and
wherein aggregating the first input and the second input comprises using a third sub-DNN to receive the first input and the second input and aggregate the first input and the second input to recover the information.

13. The method as recited in claim 12, wherein the indication comprises a first indication, and the method further comprises:
- receiving a second indication that indicates a modification to the first sub-DNN, the second sub-DNN, or the third sub-DNN; and
- updating the first sub-DNN, the second sub-DNN, or the third sub-DNN based on the second indication.

14. The method as recited in claim 10, wherein the simultaneous connection to the multiple component carriers comprises uplink carrier aggregation, and
wherein using the at least one DNN to process the information comprises:
- generating, using the at least one DNN, a first output to exchange a first portion of the information over the first component carrier of the wireless communication system; and generating, using the at least one DNN, a second output to exchange a second portion of the information over the second component carrier of the wireless communication system.

15. The method as recited in claim 14, wherein forming the at least one DNN comprises:
forming the at least one DNN based on a portion of a distributed end-to-end machine-learning configuration.

16. The method as recited in claim 10, wherein the first component carrier is in a licensed band, and
wherein the second component carrier is in an unlicensed band.

17. A network entity apparatus comprising:
a processor; and
computer-readable storage media comprising instructions that direct the network entity apparatus to perform operations comprising:
determining at least one deep neural network (DNN) configuration for processing information exchanged with a user equipment (UE) over a wireless communication system using a simultaneous connection to a first component carrier and a second component carrier,
the at least one DNN configuration including:
a first portion for forming a first DNN that generates a first output associated with the first component carrier at the network entity apparatus and a second output associated with the second component carrier;
a second portion for forming a second DNN at the UE;
communicating, to the UE, an indication of the second portion; and
using the first DNN to exchange the information, over the wireless communication system and with the UE, using the simultaneous connection to the first component carrier and the second component carrier.

18. The network entity apparatus as recited in claim 17, the operations further comprising:
receiving feedback from the UE;
determining a modification to the at least one DNN configuration by analyzing the feedback; and
communicating the modification to the UE for updating the second DNN.

19. The network entity apparatus as recited in claim 18, wherein the determining the modification comprises:
determining one or more architectural changes to the at least one DNN configuration; or
determining one or more parameter changes to the at least one DNN configuration.

20. The network entity apparatus as recited in claim 17, wherein determining the at least one DNN configuration comprises:
determining, for the second portion, a second DNN configuration that forms the second DNN to process the information by aggregating a first input associated with the first component carrier and a second input associated with the second component carrier.

21. The method as recited in claim 1, wherein the second DNN generates, at a second network entity, the second output associated with the second component carrier.

* * * * *